United States Patent
Ikeda et al.

(10) Patent No.: US 7,365,907 B2
(45) Date of Patent: Apr. 29, 2008

(54) REAR PROJECTION IMAGE DISPLAY APPARATUS

(75) Inventors: Hidehiro Ikeda, Yokohama (JP); Koji Hirata, Yokohama (JP); Shuji Kato, Yokohama (JP); Masahiro Yamamoto, Yokohama (JP); Masahiko Yatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 165 days.

(21) Appl. No.: 10/953,413

(22) Filed: Sep. 28, 2004

(65) Prior Publication Data

US 2005/0146786 A1 Jul. 7, 2005

(30) Foreign Application Priority Data

Jan. 7, 2004 (JP) ............................. 2004-001604

(51) Int. Cl.
*G03B 21/22* (2006.01)
*G03B 21/26* (2006.01)
*G03B 21/14* (2006.01)
*G03B 21/56* (2006.01)
*G02F 1/29* (2006.01)
*G02B 27/10* (2006.01)
*G02B 15/14* (2006.01)
*G02B 9/06* (2006.01)

(52) U.S. Cl. .................. 359/460; 359/449; 359/319; 359/625; 359/626; 359/684; 359/794; 353/76; 353/77; 353/34; 353/49; 353/82; 353/119

(58) Field of Classification Search ............ 353/76–77, 353/30, 34, 49, 82, 119, 97; 359/443, 460, 359/449, 319, 625–626, 684, 794, 793

See application file for complete search history.

(56) References Cited

U.S. PATENT DOCUMENTS

| | | | | |
|---|---|---|---|---|
| 5,539,579 A | * | 7/1996 | Miyatake et al. | 359/634 |
| 5,539,580 A | | 7/1996 | Kim | |
| 6,094,311 A | * | 7/2000 | Moskovich | 359/651 |
| 6,577,455 B2 | * | 6/2003 | Shikama | 359/753 |
| 6,761,458 B2 | * | 7/2004 | Sakata et al. | 353/78 |

FOREIGN PATENT DOCUMENTS

| | | |
|---|---|---|
| JP | 05-134213 | 5/1993 |
| JP | 06-265814 | 9/1994 |
| JP | 11-326759 | 11/1999 |
| JP | 2000-162544 | 6/2000 |
| JP | 2002-357768 | 12/2002 |

* cited by examiner

*Primary Examiner*—Diane I. Lee
*Assistant Examiner*—Magda Cruz
(74) *Attorney, Agent, or Firm*—Townsend and Townsend and Crew LLP

(57) ABSTRACT

A compact rear projection image display apparatus in which the projection distance in a projection optical system is substantially reduced and no reflection mirror is used, thereby eliminating a major cause of image trapezoidal distortion. The rear projection image display apparatus has a projection lens system which includes a first lens group with positive refractive power and a second lens group which further enlarges an image enlarged by the first lens group. The projection lens system enlarges and projects an image displayed on an image display device, on a transmission screen. No reflection mirror is provided between the second lens group and the transmission screen and the image enlarged by the second lens group is directly projected on the transmission screen.

8 Claims, 30 Drawing Sheets

FIG.13

| Plane No. | Curvature Radius | Interplane Distance | Glass Material |
|---|---|---|---|
| Object Plane | ∞ | 6.528 | |
| 1 | ∞ | 31.342 | BSC7_HOYA |
| 2 | ∞ | 7.33 | |
| 3 | 190.8 | 6.1 | TAF3_HOYA |
| 4 | -55.5 | 0.2 | |
| 5 | 67.059 | 3.29 | TAF3_HOYA |
| 6 | 382.4 | 0.2 | |
| 7 | 34.8 | 3.61 | TAF3_HOYA |
| 8 | 60.172 | 9.7 | |
| 9 | -268.57 | 1 | EFD8_HOYA |
| 10 | 42.27 | 8.3 | |
| 11 | -439.45 | 0.8 | EFD8_HOYA |
| 12 | 17.976 | 3.02 | FCD1_HOYA |
| 13 | -40 | 0.2 | |
| 14 Aperture Diaphragm Plane | 21.115 | 3.85 | BACD18_HOYA |
| 15 | 84.8 | 14.14 | |
| 16 | 50.616 | 6.92 | EFD4_HOYA |
| 17 | 25.943 | 9.39 | |
| 18 | -11.008 | 1.8 | FCD1_HOYA |
| 19 | 605.74 | 7.86 | |
| 20 | -72.6 | 14.58 | TAF3_HOYA |
| 21 | -28.1 | 0.2 | |
| 22 | 65.31 | 14.71 | TAF3_HOYA |
| 23 | 264.92 | 34.82 | |
| 24 | -31.65 | 5.11 | PMMA |
| 25 | -31.113 | 5 | |
| Primary Image Plane | ∞ | 0 | |

| Plane No. | K | A | B | C | D | E |
|---|---|---|---|---|---|---|
| 24 | 0 | 2.6583E-05 | -7.3374E-08 | -1.4933E-10 | -1.3814-E | 5.4234E-17 |
| 25 | 0 | 3.7074E-05 | -1.1429E-07 | -2.2442E-10 | -2.0717E-13 | 8.0805E-17 |

WAVELENGTH 650, 550, 450NM

FIG.19

| Plane No. | Curvature Radius | Interplane Distance | Glass Material |
|---|---|---|---|
| Object Plane | ∞ (panel surface) | 6.528 | |
| 1 | ∞ | 31.342 | BSC7_HOYA |
| 2 | ∞ | 7.33 | |
| 3 | 176.2237 | 6.1 | TAF3_HOYA |
| 4 | -46.36 | 0.2 | |
| 5 | 36.3345 | 3.99 | TAF3_HOYA |
| 6 | 106.5 | 0.2 | |
| 7 | 58.895 | 2.82 | TAF3_HOYA |
| 8 | 65.436 | 6.87 | |
| 9 | -79.8273 | 1 | EFD8_HOYA |
| 10 | 297.8 | 9.88 | |
| 11 | -102.38 | 0.8 | EFD8_HOYA |
| 12 | 15.9636 | 3.02 | FCD1_HOYA |
| 13 | -32.73 | 0.2 | |
| 14 Aperture Diaphragm Plane | 18.6502 | 3.85 | BACD18_HOYA |
| 15 | 31.1066 | 17.97 | |
| 16 | 23.91 | 7.5 | EFD4_HOYA |
| 17 | 19.5 | 7.54 | |
| 18 | -11.25378321 | 1.8 | FCD1_HOYA |
| 19 | 217.63 | 11.35 | |
| 20 | -75 | 13.47 | TAF3_HOYA |
| 21 | -30.6814 | 0.2 | |
| 22 | 57.0473 | 11.85 | TAF3_HOYA |
| 23 | 305.5642 | 22.95 | |
| 24 | -37.4072 | 3.5 | PMMA |
| 25 | -48.9025 | 7.876 | |
| Primary Image Plane | ∞ (object surface) | 0 | |

| Plane No. | K | A | B | C | D | E |
|---|---|---|---|---|---|---|
| 24 | 0 | 3.4526E-05 | -3.6247E-08 | 3.3065E-11 | -1.4755E-14 | 3.6803E-18 |
| 25 | 0 | 3.5425E-05 | -5.1937E-08 | 8.6015E-11 | -9.3416E-14 | 5.0304E-17 |

WAVELENGTH 650, 550, 450NM

FIG.25

| Plane No. | Curvature Radius | Interplane Distance | Glass Material |
|---|---|---|---|
| Object Plane | ∞ | 6.5280 | |
| 1 | ∞ | 31.342 | BSC7_HOYA |
| 2 | ∞ | 7.33 | |
| 3 | 127.7052 | 6.1 | TAF3_HOYA |
| 4 | -49.5508 | 0.2 | |
| 5 | 34.2747 | 4.1764 | TAF3_HOYA |
| 6 | 104.1570 | 0.2 | |
| 7 | 31.6237 | 5.7931 | TAF3_HOYA |
| 8 | 34.6721 | 5.1651 | |
| 9 | 741.7637 | 1.8 | EFD8_HOYA |
| 10 | 32.1716 | 5.8572 | |
| 11 | -33.5433 | 0.5618 | EFD8_HOYA |
| 12 | 15.4628 | 2.7796 | FCD1_HOYA |
| 13 | -27.3183 | 0.2 | |
| 14 Aperture Diaphragm Plane | 21.1404 | 3.85 | BACD18_HOYA |
| 15 | 302.9889 | 16.0096 | |
| 16 | 28.3531 | 6.6145 | EFD4_HOYA |
| 17 | 22.6032 | 6.9384 | |
| 18 | -11.3689 | 1.8 | FCD1_HOYA |
| 19 | 212.0065 | 10.5911 | |
| 20 | -89.0163 | 12.8067 | TAF3_HOYA |
| 21 | -31.2439 | 0.2 | |
| 22 | 59.1155 | 10.4768 | TAF3_HOYA |
| 23 | 256.4774 | 32.9590 | |
| 24 | -38.0308 | 3.5 | PMMA |
| 25 | -35.1510 | 6.2208 | |
| First Enlarged Image Plane | ∞ (image surface) | 0 | |

| Plane No. | K | A | B | C | D | E |
|---|---|---|---|---|---|---|
| 24 | 0 | 2.9332E-05 | -31.299E-08 | 3.7631E-11 | -2.2287E-14 | 4.790E-18 |
| 25 | 0 | 3.6927E-05 | -4.4805E-08 | 5.1104E-11 | -1.8533E-14 | -1.4722E-18 |

WAVELENGTH 650, 550, 450NM

| Plane No. | Curvature Radius(mm) | Interplane Distance(mm) | Glass Material |
|---|---|---|---|
| 0 | ∞ | 3.000 | |
| 1 | 57.150 | 13.332 | FDS90_HOYA |
| 2 | -488.992 | 8.288 | |
| 3 | 29.406 | 5.000 | PMMA |
| 4 | 21.234 | 7.476 | |
| 5 | 26.759 | 4.250 | PMMA |
| 6 | 22.576 | 1.093 | |
| 7 | 24.227 | 9.717 | FCD1_HOYA |
| 8 | -419.122 | 1.000 | |
| 9 | 83.447 | 1.210 | FDS90_HOYA |
| 10 | 20.066 | 10.095 | FCD1_HOYA |
| 11 | -36.944 | 0.409 | |
| 12 | -43.454 | 1.933 | FDS90_HOYA |
| 13 | -60.956 | 31.98000 | |
| 14 | 128.323 | 10.521 | TAF1_HOYA |
| 15 | -35.236 | 1.720 | |
| 16 | -35.351 | 4.000 | PMMA |
| 17 | -65.227 | 0.407 | |
| 18 | 48.727 | 4.000 | PMMA |
| 19 | 27.539 | 1.349 | |
| 20 | 30.716 | 14.813 | EFD15_HOYA |
| 21 | 166.068 | 6.360 | |
| 22 | -47.252 | 1.923 | FDS90_HOYA |
| 23 | 58.694 | 19.412 | |
| 24 | -23.615 | 2.000 | TAF3_HOYA |
| 25 | -58.878 | 19.830 | |
| 26 | -41.753 | 4.500 | PMMA |
| 27 | -732.177 | 359.992 | |
| 28 | ∞ | 0 | |

| Plane No. | K | A | B | C | D | E |
|---|---|---|---|---|---|---|
| 3 | 0 | -2.27563E-06 | -7.41067E-08 | 5.37241E-11 | 1.81698E-14 | 7.67522E-18 |
| 4 | 0 | -3.74233E-05 | -2.96048E-08 | 5.53793E-12 | 2.21526E-14 | -2.86387E-16 |
| 5 | 0 | -8.00316E-05 | 3.31496E-08 | -4.92358E-12 | 1.43783E-13 | 6.25858E-18 |
| 6 | 0 | -5.02058E-05 | -3.3811E-08 | 2.36314E-10 | 1.23767E-13 | -1.27257E-18 |
| 16 | 0 | -1.57517E-06 | -1.43263E-08 | 1.59407E-11 | -4.7094E-14 | 7.45426E-18 |
| 17 | 0 | -1.53039E-06 | -5.60941E-09 | -1.95417E-11 | 1.10345E-14 | -4.39109E-18 |
| 18 | 0 | 5.25138E-06 | -2.63872E-08 | 4.63525E-11 | -5.75934E-14 | 2.19102E-17 |
| 19 | 0 | 7.6745E-06 | -3.91991E-08 | 7.61124E-11 | -8.94411E-14 | 2.70039E-17 |
| 26 | 0 | -7.77176E-06 | -1.97142E-10 | 1.0158E-11 | 8.58691E-15 | 2.63033E-18 |
| 27 | 0 | -1.09701E-05 | 9.31739E-09 | -5.27499E-12 | 1.59852E-15 | -2.1005E-19 |

| Plane No. | Curvature Radius(mm) | Interplane Distance(mm) | Glass Material |
|---|---|---|---|
| 0 | ∞ | 3.000 | |
| 1 | 57.150 | 12.828 | FDS90_HOYA |
| 2 | -562.386 | 9.234 | |
| 3 | 29.220 | 3.600 | PMMA |
| 4 | 21.284 | 7.571 | |
| 5 | 26.757 | 3.600 | PMMA |
| 6 | 22.660 | 1.378 | |
| 7 | 24.226 | 8.632 | FCD1_HOYA |
| 8 | 407.372 | 1.000 | |
| 9 | 52.722 | 1.000 | FDS90_HOYA |
| 10 | 18.321 | 10.513 | FCD1_HOYA |
| 11 | -39.891 | 0.200 | |
| 12 | -49.694 | 3.165 | FDS90_HOYA |
| 13 | -77.192 | 31.98000 | |
| 14 | 118.806 | 10.075 | TAF1_HOYA |
| 15 | -35.800 | 0.749 | |
| 16 | -37.282 | 3.600 | PMMA |
| 17 | -68.708 | 0.200 | |
| 18 | 50.201 | 3.500 | PMMA |
| 19 | 27.812 | 1.682 | |
| 20 | 31.449 | 17.666 | EFD15_HOYA |
| 21 | 167.085 | 5.056 | |
| 22 | -46.959 | 1.429 | FDS90_HOYA |
| 23 | 60.885 | 18.538 | |
| 24 | -23.345 | 1.700 | TAF3_HOYA |
| 25 | -57.428 | 20.638 | |
| 26 | -41.497 | 4.500 | PMMA |
| 27 | -696.141 | 360.000 | |
| 28 | ∞ | 0 | |

| Plane No. | K | A | B | C | D | E |
|---|---|---|---|---|---|---|
| 3 | 0 | -3.62371E-06 | -7.47138E-08 | 5.64765E-11 | 2.23033E-14 | 1.44752E-17 |
| 4 | 0 | -3.76725E-05 | -2.98152E-08 | 1.12208E-11 | 4.12014E-14 | -3.06283E-16 |
| 5 | 0 | -7.96851E-05 | 3.42837E-08 | -6.03352E-12 | 1.41803E-13 | -1.04537E-17 |
| 6 | 0 | -5.07635E-05 | -4.15923E-08 | 2.26678E-10 | 1.10051E-13 | -1.05574E-16 |
| 16 | 0 | -1.47474E-06 | -1.4457E-08 | 1.67869E-11 | -4.63233E-14 | 7.28913E-18 |
| 17 | 0 | -1.49884E-06 | -5.52614E-09 | -1.95898E-11 | 1.08191E-14 | -4.78752E-18 |
| 18 | 0 | 5.27274E-06 | -2.66813E-08 | 4.66146E-11 | -5.7502E-14 | 2.08859E-17 |
| 19 | 0 | 7.68219E-06 | -3.87473E-08 | 7.62E-11 | -8.94476E-16 | 2.67444E-17 |
| 26 | 0 | -8.0394E-06 | -1.09101E-10 | 1.01892E-11 | -8.56579E-15 | 2.63973E-18 |
| 27 | 0 | -1.11449E-05 | 9.4211E-09 | -5.26243E-12 | 1.57239E-15 | -2.0465E-19 |

REAR PROJECTION IMAGE DISPLAY APPARATUS

BACKGROUND OF THE INVENTION

1. Field of the Invention

The present invention relates to a rear projection image display apparatus which enlarges and projects an image displayed on an image display device, for example, on a transmission screen through a projection lens system.

2. Description of the Related Art

As an image source for a rear projection image display apparatus (hereinafter sometimes called a "set"), transmission or reflection liquid crystal panels or pixel-selective image display devices such as micromirror devices may be used in place of three CRTs (CRTs which display red, blue and green images). As projection lens systems for the compactness of a set which uses such image display devices, those described in JP-A No. 134213/1993 (literature 1), JP-A No. 162544/2000 (literature 2) and JP-A No. 357768/2002 (literature 3) have been widely known. These patent literature documents disclose projection lens systems which enlarge and project an image on a screen obliquely.

As described in literature 1 to 3, when an image is projected on a screen obliquely, the image projected on the screen is distorted into a trapezoidal image. In the projection optical system described in literature 1, an afocal converter located on the screen side is decentered or eccentric to suppress image trapezoidal distortion. However, the magnification of the disclosed afocal converter is too low to permit a wide view angle (make the set compact). In the projection optical system described in literature 2, it is impossible to make the view angle wide enough to realize a sufficiently thin (low-profile) rear projection image display apparatus; therefore, the lenses in use must be decentered individually and thus there is difficulty in its manufacture. The projection optical system described in literature 3 consists of a first refractor system with positive refractive power, a second refractor system with negative refractive power and an optical path turning mirror where at least two lenses in the second refractor system with negative refractive power are different in rotational symmetry or eccentric. Hence, the problem is that in the manufacturing process, it is not easy to assure positional accuracy of each lens.

In the above prior art, attention has been paid only to the projection optical system including a projection lens but few efforts have been made to optimize the overall system design in consideration of space for drive circuitry in the housing. Particularly, one problem is that the reflection mirror provided for the sake of the compactness of the set is very sensitive and its positional error might cause image trapezoidal distortion. The use of the reflection mirror somewhat helps reduce the size of the set but makes it impossible to taper the set from its front side to its back side; as a consequence, when the set is viewed sideways, it does not look thin enough.

Hence, in order to assure high quality of an image on the transmission screen and compactness of the set, it is necessary to employ an adequate housing structure and a projection optical system which provides a wide view angle, high focus, high magnification and long back focus. It is also desirable that an image from the projection lens system be directly projected on the transmission screen in enlarged form without the use of a reflection mirror.

SUMMARY OF THE INVENTION

The present invention has been made in view of the above problems and provides a technique which contributes to the compactness of the set.

In order to achieve the above objects, according to one aspect of the present invention, a projection image display apparatus uses a projection lens system which enlarges and projects an image displayed on an image display device, on a transmission screen, where the projection lens system includes a first lens group with positive refractive power and a second lens group with positive refractive power which further enlarges the image enlarged by the first lens group. The image enlarged by the second lens group is projected on the transmission screen directly, or without changing, by means of a reflection mirror or the like, the optical path for a light beam from the second lens group which extends from the exit plane of the second lens group to the transmission screen.

In other words, in the present invention, a first enlarged image made by the first lens group is once focused in a position on the image display device side rather than the second lens group side and this first enlarged image is directly enlarged and projected on the screen by the second lens group. A field lens group with positive refractive power is located between the first lens group and the second lens group and the magnification $M1$ of the first enlarged image may be smaller than the magnification $M2$ of a second enlarged image made on the screen by the second lens group.

According to another aspect of the invention, the first lens group should be telecentric on the image display device side and designed to suit the F number of the illumination optical system. The first enlarged image made by the first lens group is focused in a position on the image display device side rather than the second lens group side and the F number of the second lens group, $F2$ (ray divergence angle) is calculated by multiplying the F number of the first lens group $F1$ by the magnification of the first enlarged image $M1$, namely $F2=F1 \times M1$. Thus, $F2$ can be large enough to allow a view angle of over 90 degrees.

According to another aspect of the invention, an optical path turning means is located between the first lens group and the second lens group and the first lens group is virtually perpendicular to the horizontal direction of the screen surface and the second lens group is virtually perpendicular to the screen surface. This enables an image from the projection lens system to be directly projected on the screen in enlarged form, leading to a more compact apparatus.

The above structure eliminates the need for a reflection mirror which would be required in a conventional projection image display apparatus. Consequently, the problem of trapezoidal distortion is resolved and a more compact apparatus is realized. Therefore, the present invention increases the compactness of the set.

BRIEF DESCRIPTION OF THE DRAWINGS

The invention will be more particularly described with reference to the accompanying drawings, in which:

FIG. 13 shows lens data for the first lens group in the projection optical system according to the first embodiment of the present invention;

FIG. 19 shows lens data for the first lens group in the projection optical system according to the second embodiment of the present invention;

FIG. 25 shows lens data for the first lens group in the projection optical system according to the third embodiment of the present invention;

FIG. 31 shows lens data for the second lens group in the projection optical system according to the first embodiment of the present invention;

FIG. 37 shows lens data for the second lens group in the projection optical system according to the second embodiment of the present invention;

DETAILED DESCRIPTION OF THE PREFERRED EMBODIMENTS

Next, a projection image display apparatus and a rear projection image display apparatus which use a projection optical unit according to the present invention will be descried referring to the accompanying drawings.

Figure 1:
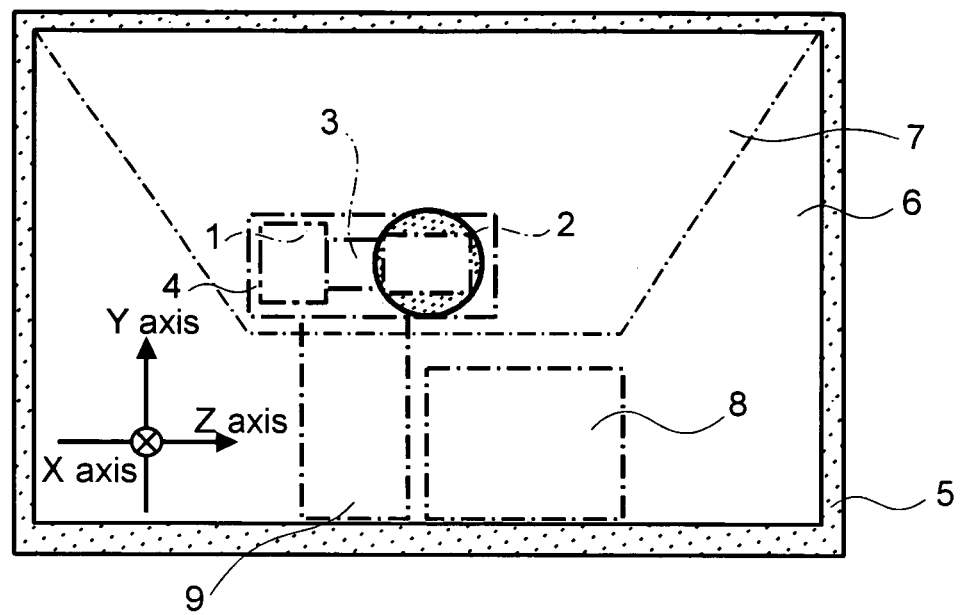
FIG. 1 is a front view showing a rear projection image display apparatus according to an embodiment of the present invention.

FIG. 1 is a front view showing a rear projection image display apparatus which uses a projection optical unit according to an embodiment of the present invention. In the figure, numeral 1 represents an illumination optical system; 5 a housing; 6 a screen; and 7 a back cover. Numeral 4 represents a projection optical unit whereby light from a white light source is cast on an image display device (not shown) by the illumination optical system 1 and an image formed according to an image signal at the image display device is enlarged and projected. Numeral 3 represents a first lens barrel which incorporates a first lens group (not shown, explained later) with positive refractive power of the projection optical unit; 2 a second lens barrel which incorporates a second lens group (not shown, explained later) with positive refractive power of the projection optical unit. Light from the white light source is cast on the image display device by the illumination optical system 1 and captured by the first lens group of the projection optical unit and passed through a field lens and focused as an image in a position on the image display device side rather than the second lens group side. Furthermore, the image is enlarged and projected as an object point on the screen by the second lens group. Here, a flare stop (marked with hatching) may be provided in an area other than the effective area (area through which an image light beam passes) of the lens nearest to the screen among the lenses built in the second lens barrel. In this rear projection image display apparatus, the optical unit 4 is located on the left side with respect to the screen center of the set and a chassis 8 which houses a signal circuit and a power supply circuit is located in the right side space. The first lens barrel 3 and the second lens barrel 2 are separate from each other. The optical unit which includes the illumination optical system, the first lens barrel 3 and the second lens barrel 2 is supported through a base 9 by the bottom of the set and held at a given height.

As another embodiment of the present invention, a rear projection image display apparatus may be such that the optical unit 4 is on the right side with respect to the screen center and the chassis 8 incorporating a signal circuit, a power supply circuit, etc is on the left side.

Figure 8:
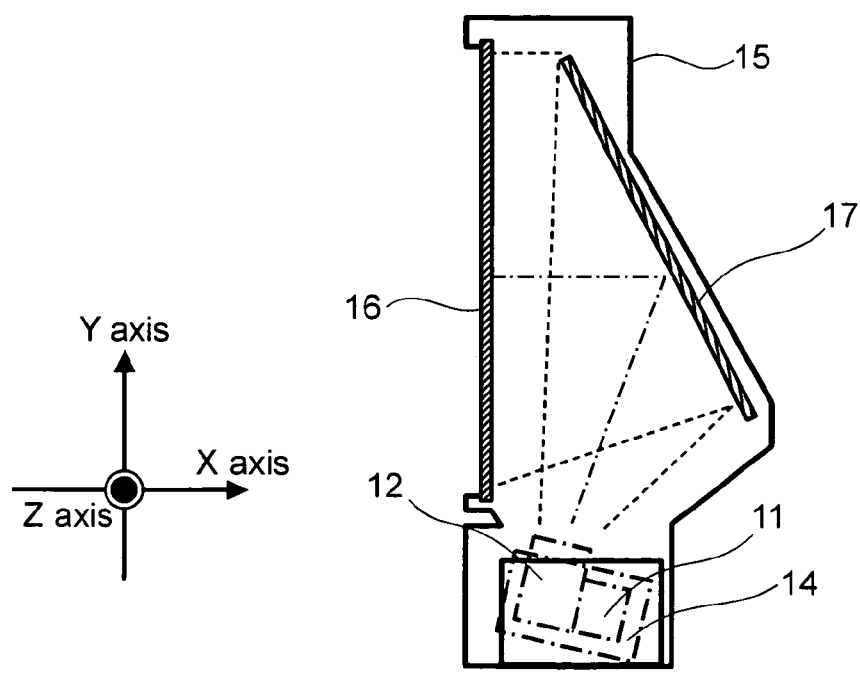
FIG. 8 is a side view showing a conventional rear projection image display apparatus.

The optical unit 4 is located almost in the center of the housing 5 as shown in 1 and image light from it is directly projected on the rear of the screen 6. In the prior art, image light from a projection lens unit is projected on the screen through a reflection mirror 17 as shown in FIG. 8. The problem is that the reflection mirror is highly sensitive in terms of positional accuracy and if it is not exactly in a prescribed position, image trapezoidal distortion is likely to occur. In the present invention, image light is projected on the screen from the projection lens unit directly, or without using the reflection mirror 17 and one factor which contributes to trapezoidal distortion is eliminated.

According to the present invention, the projection optical unit 4 includes the first lens group (not shown, explained later) built in the first lens barrel 3 with its optical axis almost parallel to the horizontal direction of the screen 6, and the second lens group (not shown, explained later) built in the second lens barrel 2 with its optical axis almost perpendicular to the optical axis of the first lens group. An optical path turning means (not shown, explained later) is provided in the connection of the first lens group and the second lens group to lead image light from the first lens group into the second lens group. This optical path turning means may be built in the first lens group or the second lens group.

In order to prevent contrast deterioration of an enlarged image due to veiling glare in the first lens group, a flare stop may be provided in an area of the lens nearest to the second lens group among the lenses of the first lens group other than its effective area (area through which an image light beam passes, not shown).

Similarly, a flare stop may be provided in an area of the lens nearest to the first lens group among the lenses of the second lens group other than its effective area (area through which an image light beam passes, not shown).

Furthermore, it is more desirable to provide a flare stop in an area of the optical path turning means between the first lens group and the second lens group other than its effective area (area through which an image light beam passes).

According to the present invention, the projection optical unit 4 is divided into at least two lens groups whose optical axes are almost perpendicular to each other, where the optical axis of the first lens group is almost parallel to the horizontal direction of the screen 6. Therefore, the depth of the rear projection image display apparatus can be small and the height of the projection optical unit can be low and thus the present invention is advantageous in making the set compact.

A lamp for horizontal lighting is used as a light source. When this lamp is located almost parallel to the horizontal direction of the screen, the lamp service life is lengthened and this arrangement is useful for size reduction.

For simple illustration, an orthogonal coordinate system (right hand system) is introduced here. Referring to FIG. 1, the screen 6 is parallel to the YZ plane and the horizontal direction of the screen 6 corresponds to the Z axis and its vertical direction corresponds to the Y axis. The direction which extends through the screen 6 from its front side (viewer side) to its rear side corresponds to the X axis.

Figure 2:
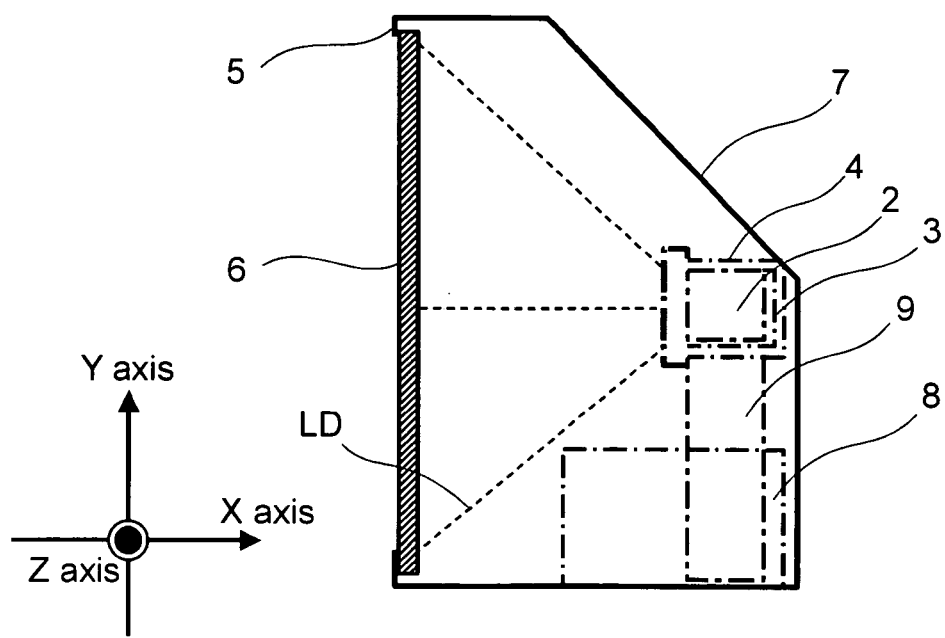
FIG. 2 is a side view showing a rear projection image display apparatus according to an embodiment of the present invention.

FIG. 2 is a side view showing a rear projection image display apparatus which uses a projection optical unit according to the present invention. The components with the same functions as those shown in FIG. 1 are designated by the same reference numerals. In FIG. 2, the optical axis $3_1$ (Z axis in the figure, hereinafter called the optical axis of the first lens barrel) of the first lens group (not shown) built in the first lens barrel 3 and the optical axis $2_1$ (hereinafter called the optical axis of the second lens barrel) of the second lens group (not shown) built in the second lens barrel 2 are arranged through the built-in optical path turning means (not shown) so that they are almost orthogonal to each other. In this embodiment, the optical axis $2_1$ of the second lens barrel 2 and the optical axis $3_1$, of the first lens barrel 3 coincide with each other (not out of alignment virtually in the Y direction on the right side in the figure). The optical axis of the projection optical unit is not decentered with respect to the screen 6, which means that the angle of the light beam LD going from the second lens barrel 2 to the lower end of the screen 6 with respect to the X axis is equal to the angle of the light beam UD going to the upper end of the screen 6 with respect to the X axis. Therefore, the optical unit 4 may be raised in the screen vertical direction or Y axis direction and the second lens barrel 2 may be located above the lower end of the screen 6 in the screen vertical direction. In this structure, the distance between the screen lower end and the bottom of the housing 5 is short so that a compact set can be realized.

When the optical axis $2_1$ of the second lens barrel 2 is shifted downward or virtually in the minus Y direction with respect to the optical axis $3_1$ of the first lens barrel 3, the optical axis of the projection optical unit is decentered with respect to the screen 6. Hence, the angle between light beam LD going from the second lens barrel 2 to the lower end of the screen 6 and the X axis is increased. This means that the position of the optical unit 4 can be lowered in the screen vertical direction or Y direction and thus the second lens barrel 2 can be located below the center of the screen 6 in the screen vertical direction. In this structure, the optical unit 4 can be located in a low position in the housing 5.

Figure 3:
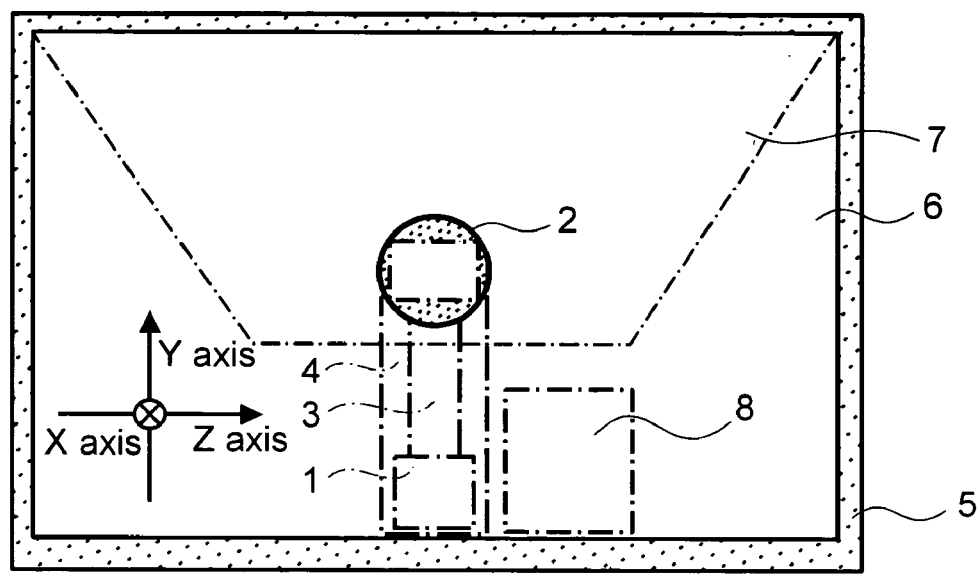
FIG. 3 is a front view showing a rear projection image display apparatus according to an embodiment of the present invention.

FIG. 3 is a front view showing a projection optical unit according to a second embodiment of the present invention. In the figure, numeral 1 represents an illumination optical system; 5 a housing; 6 a screen; and 7 a back cover. Numeral 4 represents a projection optical unit whereby light from a white light source is cast on an image display device (not shown) by the illumination optical system 1 and an image formed according to an image signal at the image display device is enlarged and projected. Numeral 3 represents a first lens barrel which incorporates a first lens group (not shown, explained later) with positive refractive power of the projection optical unit; 2 a second lens barrel which incorporates a second lens group (not shown, explained later) with positive refractive power of the projection optical unit. Here, a flare stop (marked with hatching) may be provided in an area of the lens nearest to the screen among the lenses built in the second lens barrel other than its effective area (area through which an image light beam passes). In this rear projection image display apparatus, the optical unit 4 is in alignment with the screen center of the set and a chassis 8 which houses a signal circuit, a power supply circuit, etc is located in the right or left side space (right side space in this case).

As another embodiment of the present invention, a rear projection image display apparatus may be such that the chassis 8 which houses a signal circuit, a power supply circuit, etc is on the left side of the optical unit 4.

The optical unit 4 is located almost in the center of the housing 5 and light cast from it is directly projected on the rear side of the screen 6.

According to the present invention, the projection optical unit 4 includes the first lens group (not shown, explained later) built in the first lens barrel 3 with its optical axis almost parallel to the horizontal direction of the screen 6, and the second lens group (not shown, explained later) built in the second lens barrel 2 with its optical axis almost perpendicular to the optical axis of the first lens group. It further includes an optical path turning means (not shown, explained later) which is provided in the connection of the first lens group and the second lens group to lead image light from the first lens group into the second lens group. This optical path turning means may be built in the first lens group or the second lens group.

Figure 4:
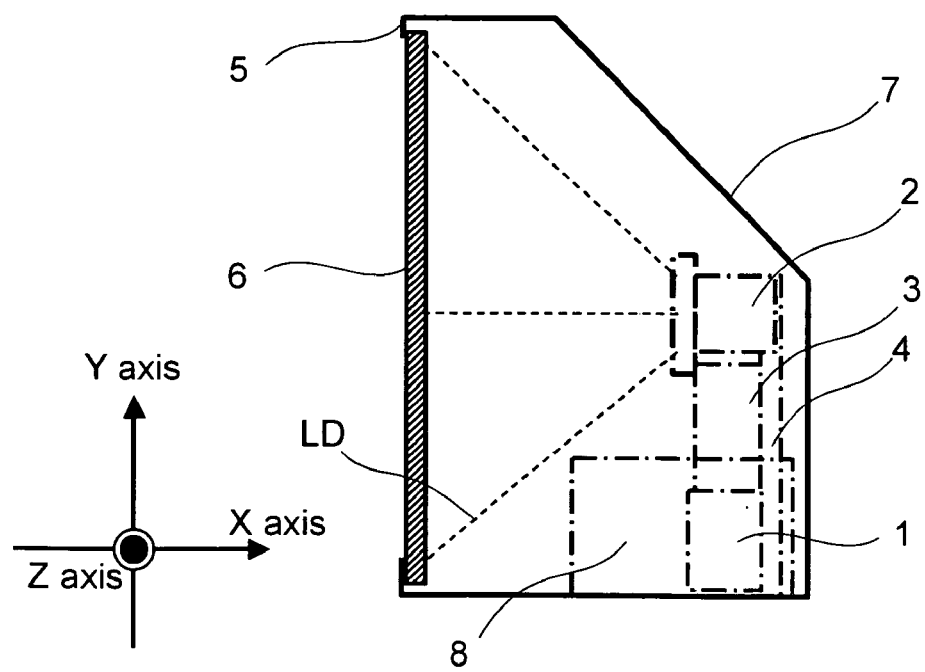
FIG. 4 is a side view showing a rear projection image display apparatus according to an embodiment of the present invention.

FIG. 4 is a side view showing the rear projection image display apparatus which uses the projection optical unit according to the second embodiment of the present invention. The components with the same functions as those shown in FIG. 1 are designated by the same reference numerals. In FIG. 4, the optical axis $3_1$ (Y axis in the figure, hereinafter called the optical axis of the first lens barrel) of the first lens group (not shown) built in the first lens barrel 3 and the optical axis $2_1$ (hereinafter called the optical axis of the second lens barrel) of the second lens group (not shown) built in the first lens barrel 2 are arranged through the built-in optical axis turning means (not shown) so that they are almost orthogonal to each other. In this embodiment, the optical axis $2_1$ of the second lens barrel 2 and the optical axis $3_1$ of the first lens barrel 3 are not decentered virtually in the top-bottom direction or Y axis direction in the figure. Therefore, the optical axis of the projection optical unit is not decentered with respect to the screen 6, which means that the angle of the light beam LD going from the second lens barrel 2 to the lower end of the screen 6 with respect to the X axis is equal to the angle of the light beam UD going to the upper end of the screen 6 with respect to the X axis. Therefore, the second lens barrel 2 may be located in alignment with the center of the screen 6 in the screen vertical direction. In this structure, the distance between the screen lower end and the bottom of the housing 5 is short so that a compact set can be realized.

When the optical axis $2_1$ of the second lens barrel 2 is shifted downward or virtually in the minus Y direction with respect to the optical axis $3_1$ of the first lens barrel 3, the optical axis of the projection optical unit is decentered with respect to the screen 6. Hence, the angle between light beam LD going from the second lens barrel 2 to the lower end of the screen 6 and the X axis is increased. This means that the position of the optical unit 4 can be lowered in the screen vertical direction or Y direction and thus the second lens barrel 2 can be located below the center of the screen 6 in the screen vertical direction. In this structure, the optical unit 4 can be located in a low position in the housing 5.

Details of the projection optical unit in the projection image display apparatus according to the first embodiment of the present invention will be described referring to FIG. 5. For convenience of illustration, components with the same functions as those in FIG. 1 are designated by the same reference numerals.

In the figure, numeral 21 represents a white lamp as a light source; and 4 a transmission liquid crystal panel 51 (52, 53).

Light from the white lamp 21 is polarized/color-separated by the illumination optical system (not shown) and cast on the transmission liquid crystal panel 51 (52, 53). On the transmission liquid crystal panel 51 (52, 53), the optical intensity of each incoming color light is modulated according to an image signal to make an optical image. These different color optical images are combined by a cross prism 27 to make up a finished color image which is then enlarged by the projection optical unit 210.

The projection optical unit 210 includes a first lens group 22 with positive refractive power and a field lens 23 which are built in the first lens barrel 3, and a second lens group 24 with positive refractive power which is built in the second lens barrel 2. Furthermore, an optical path turning means 25 which turns image lights from the first lens group 22 and the field lens 23 to lead them into the second lens group 24 is provided in the connection between the first lens barrel 3 and the second lens barrel 2. $3_1$ and $2_1$ represent the optical axis of the first lens group 22 and that of the second lens group 24, respectively. Although FIG. 6 shows one field lens 23, instead there may be several lenses as a field lens group.

Figure 6:
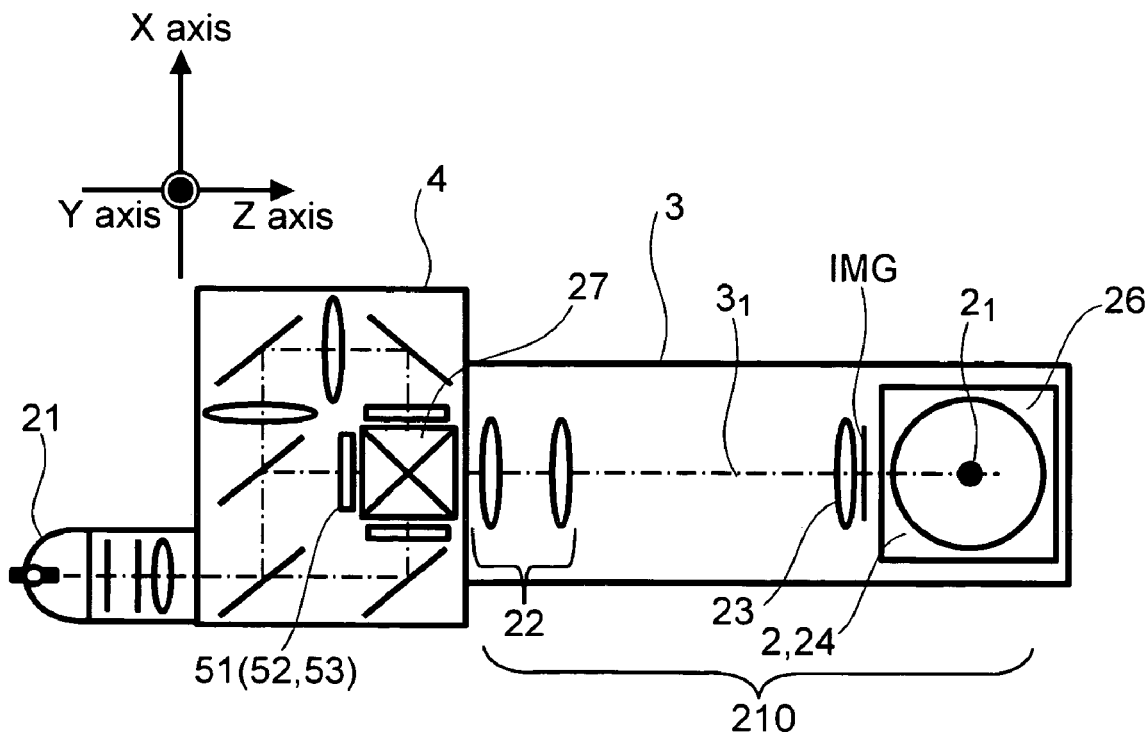
FIG. 6 illustrates the structure of a projection optical unit according to an embodiment of the present invention.

According to the present invention, a finished color image made up by the cross prism 27 is once focused as an enlarged image in the vicinity of the field lens 23 (inverted image, an example of such an image is shown as IMG in FIG. 6). The optical axis $2_1$ of the second lens group 24 is made virtually perpendicular to the optical axis $3_1$ of the first lens group 22 by the optical path turning means 25 and shifted, for example, virtually in the plus Y-axis direction (upward in FIG. 2).

Since the F number of the illumination optical system is almost in the range from 2.0 to 3.0 or so, the F number of the first lens group 22 should be in a similar range in order to bring the light beam into it efficiently. Assuming that the effective display size of the transmission liquid crystal panel is 0.7 inch and the magnification M1 of the first lens group is 3, the size of the enlarged image in the vicinity of the field lens 23 will be 2.1 inches. When the object (enlarged image in the first lens group 22, IMG in the figure) is viewed from the second lens group 24, the incidence angle of the light beam is inversely proportional to the magnification M and therefore the F number of the second lens group 24 should be theoretically 9.0 or so. Hence, it is possible to make the view angle of the second lens group 24 very wide (90 degrees or more). If the screen diagonal size is 50 inches, the magnification M2 of the second lens group 24 will be approximately 24. In other words, the magnification M1 of the first lens group 22 is smaller than the magnification M2 of the second lens group 24.

Since the projection optical unit 210 includes the first lens group and second lens group which have positive refractive power, the image made up by the cross prism 27 is focused as an inverted image (first enlarged image) in the vicinity of the field lens 23 by the first lens group 22 and this inverted image is projected on the screen as an erected image (second enlarged image) by the second lens group. In an ordinary projection color image display apparatus, an image projected on the screen is inverted with respect to the image on the image display device. In the present invention, it is an erected image.

Figure 5:
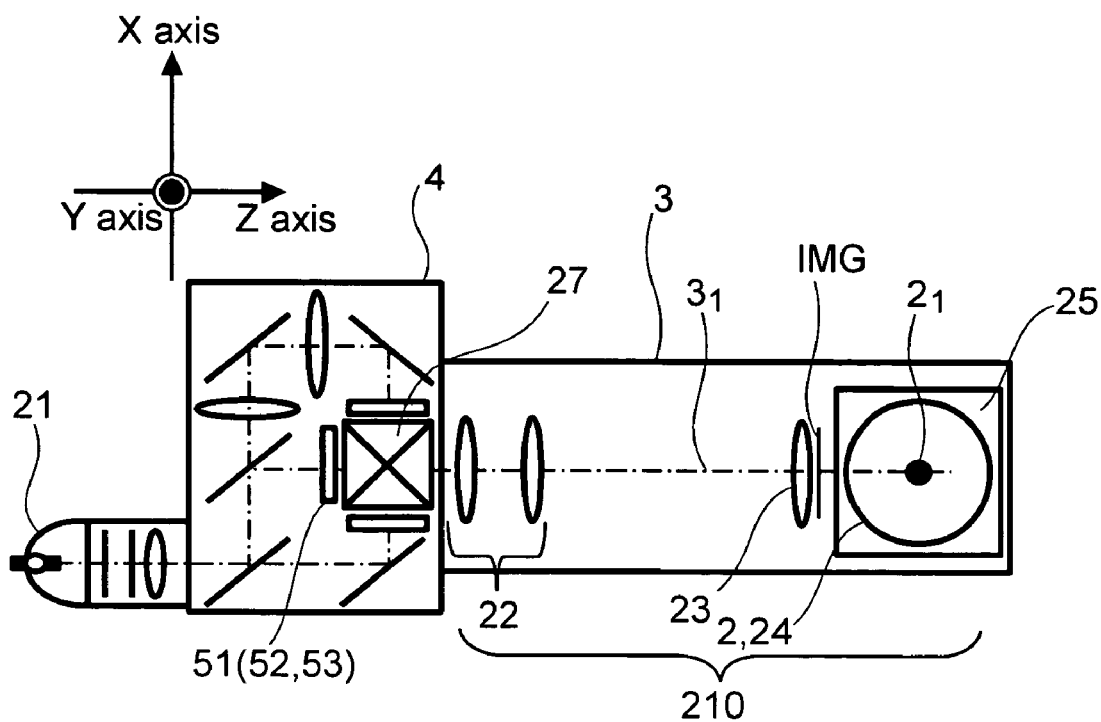
FIG. 5 illustrates the structure of a projection optical unit according to an embodiment of the present invention.

The screen horizontal direction of the transmission liquid crystal panel as an image display device should be in the XY plane with respect to the cross prism 27 which makes up an image (FIG. 5). The reason is that the size of the cross prism depends on the size of the shorter side in the display aspect ratio and the projection lens back focus can be shortened. Therefore, the cross prism can be small, which contributes to cost reduction. In addition, the optical axis of the lamp 21 can be vertically perpendicular to the optical axis of the second lens group 24. As shown in FIG. 1 or FIG. 2, when the projection image display apparatus according to the present invention is used as a rear projection image display apparatus, a lamp for horizontal lighting as a light source may be almost parallel to the screen horizontal direction. Therefore, even if the angle of elevation of the projection image display apparatus in the XY plane is changed, the layout of the inside of the set can be determined without an unfavorable influence on the lamp service life. Furthermore, the projection image display apparatus can be located off the screen center or on one side in the screen horizontal direction, a chassis housing a power supply, a signal circuit board, etc can be located in the space on the opposite side in a compact manner.

FIG. 6 shows an embodiment which uses a total reflection mirror as an optical path turning means 26 between the first lens group and the second lens group. In the figure, components with the same functions as those in FIG. 5 are designated by the same reference numerals. The functions of the components shown here are the same as in the embodiment of FIG. 5 and their descriptions are omitted here.

In the projection color image display apparatus as shown in FIGS. 1 and 2, the optical axis $2_1$ of the second lens group 24 is shifted virtually in the plus Y direction (downward in FIG. 2) with respect to the optical axis $3_1$ of the first lens group 22 almost. As a consequence, the distance from the lower end of the screen to the bottom is short as shown in FIG. 2, which contributes to size reduction of the set.

In addition, when the optical axis $2_1$ of the second lens group 24 is shifted in the Z-axis direction in the YZ plane with respect to the optical axis $3_1$ of the first lens group 22, it is unnecessary that the second lens group is in alignment with the center of the screen. This increases latitude in layout of the inside of the set and can make the set more compact.

On the other hand, even when the effective display size of the transmission liquid crystal panel is changed, the set can be used in the same form simply by modifying the illumination optical system partially and the first lens group. The projection optical unit allows efficient development of a set.

The magnification of the enlarged image obtained by the first lens group 22 depends on the effective display size of the image display device in use; preferably it should be in the range from 2 to 7 or so. More preferably it should be between 2 and 5 in order to reduce the distance between the first lens group and the image focusing position to an optimum level and allow the use of first and second lens groups dimensionally suitable for the manufacture.

In the embodiments of FIGS. 5 and 6, the optical axis of the second lens group 24 is out of alignment or shifted with respect to the optical axis of the first lens group 22 in the YZ plane and this eccentricity is selected appropriately. By doing so, for example, the eccentricity of the projection lens optical axis with respect to the transmission screen 6 (FIG. 1) can be altered as desired. Therefore, even when the screen size is constant, the form of the set can be freely modified and latitude in the design is remarkably increased.

In the projection optical unit according to the present invention as shown in FIGS. 3 and 4, in comparison with the first embodiment of FIG. 5, the first lens barrel 3 which incorporates the first lens group 22 with positive refractive power and the field lens 23 is located along the Y axis direction and the optical axis of the second lens group 24 with positive refractive power which is built in the second lens barrel 2 is along the X axis direction. The other components are the same as in the first embodiment and their descriptions are omitted here.

Figure 7:
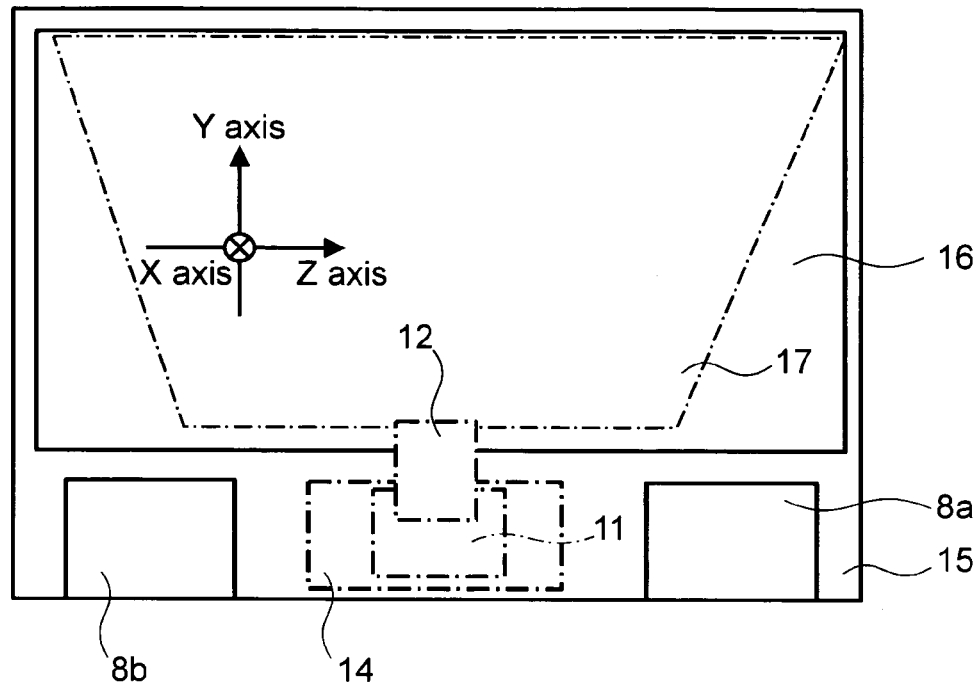
FIG. 7 is a front view showing a conventional rear projection image display apparatus.
Figure 9:
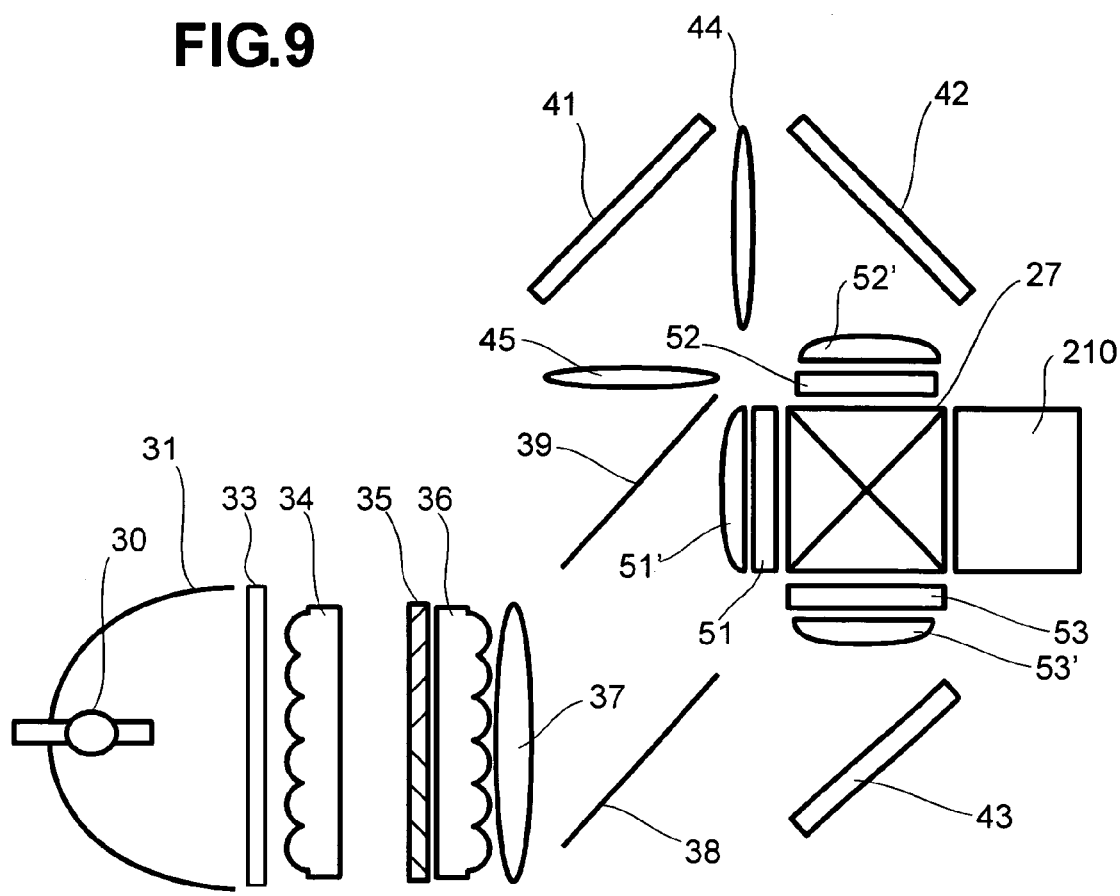
FIG. 9 shows the arrangement of an illumination optical system in a rear projection image display apparatus according to an embodiment of the present invention.

FIG. 7 is a front view showing a set used to illustrate the characteristics of the structure of a rear projection color image display apparatus which uses a projection optical system according to the present invention. FIG. 9 shows layout of an illumination optical system where the projection image display apparatus in the first embodiment uses transmission liquid crystal panels as image display devices.

A white light beam emitted from a lamp tube 30 as a white light source is reflected by a reflector 31 as required and passed through explosion-proof glass 33. This beam is divided by a fly-eye lens 34 and single-polarized by a polarizing beam splitter 35. The sub-beams as single-polarized light are enlarged and projected on the liquid crystal panel (G) 51, liquid crystal panel (B) 52 and liquid crystal panel (R) 53 through a fly-eye lens 36 and a field lens 37 on the opposite side and then overlapped. Therefore, the energy of incident beams on the panels is uniformly distributed. The white beam is divided into a red beam and a cyan beam by a dichroic mirror 38 in the optical path and the color purity of the red image light is improved by the spectral reflectance of the dichroic mirror 38 and the spectral reflectance of a trimming filter in a lens 53'.

A dichroic mirror 39 reflects greenish light. Like the lens for red, a lens 51' uses a trimming filter. The last blue beam is divided into different wavelengths of light, for example, by a mirror 41, a mirror 42 or a dichroic mirror in a lens 52'. Light with short wavelengths is cut by the fly-eye lens 34 with a UV cut filter and lens 44.

The above explanation concerns the color separation section of the illumination optical system according to the present invention where transmission liquid crystal panels are used as image display devices. Red, green and blue light beams which result from color separation by the abovementioned technique impinge on the transmission liquid crystal panels 53, 51 and 52 respectively and the light quantity (light intensity) of outgoing beams is modulated according to the amplitude of the image signal. The modulated color light beams are combined by the cross prism 27 and the finished color image is enlarged and projected on the screen by the projection optical unit 210. The white light source may be a super-high-pressure mercury lamp, xenon lamp, or metal halide lamp.

Although the transmission liquid crystal panels are used in the above illumination optical system, according to the present invention, even when reflection liquid crystal panels are used as image display devices, it is obvious that the projection optical unit may be applied to the process after makeup of a finished color image.

As described above, the projection optical unit according to the present invention consists of at least two groups of lenses. The field lens group may be located either on the second lens group side, or the first lens group side with respect to the optical path turning means. This provides wide latitude in layout. However, when the fields lenses are located on the second lens group side, the apertures of individual lenses in the field lens group and the second lens group must be relatively large, resulting in a costly unit. Since the field lens surfaces are close to the imaging plane for the first lens group, dust on a field lens surface might deteriorate the quality of the final enlarged image on the screen. Therefore, the unit must be designed with this in mind.

As mentioned so far, the projection optical unit according to the present invention includes at least two lens groups and as shown in FIG. 5 or 6, the cross prism 27 for combination of color light beams exists between the transmission liquid crystal panels as image display devices and the first lens group 22. Hence, the lenses of the first lens group should be retro focus lenses. Because light beams in the illumination optical system are almost parallel, it should be a telecentric optical system and the image enlarged by the first lens group 22 is focused in the vicinity of the field lens group 23.

Figure 11:
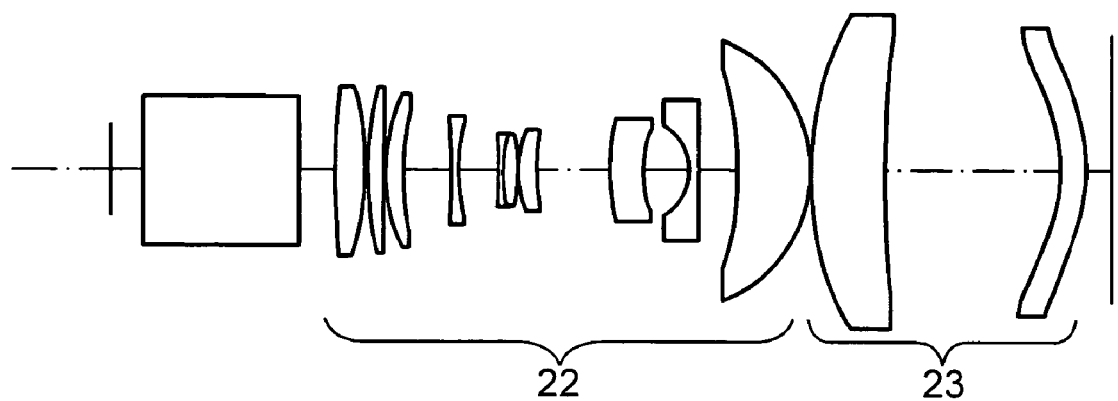
FIG. 11 shows the arrangement of a first lens group in a projection optical system according to a first embodiment of the present invention.
Figure 12:
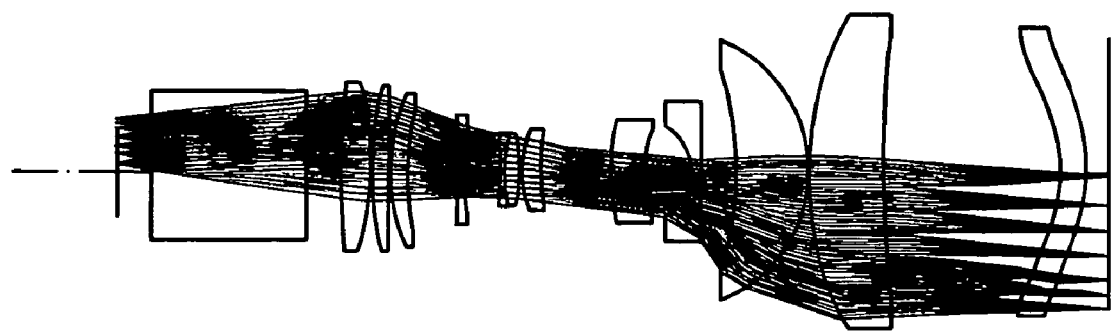
FIG. 12 is a ray tracing diagram for the first lens group in the projection optical system according to the first embodiment of the present invention.
Figure 14:
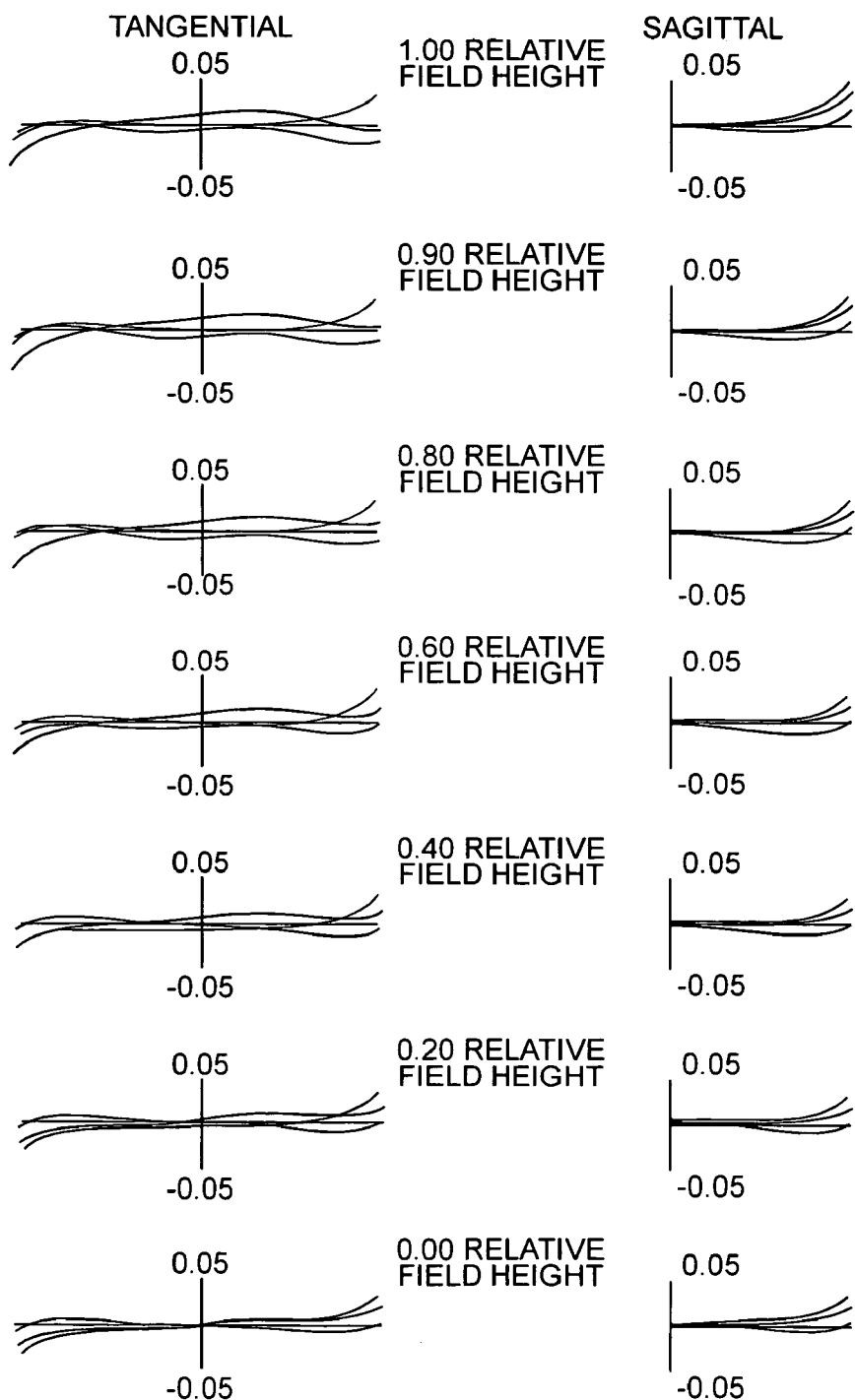
FIG. 14 shows aberration on the imaging plane for the first lens group in the projection optical system according to the first embodiment of the present invention.
Figure 15:
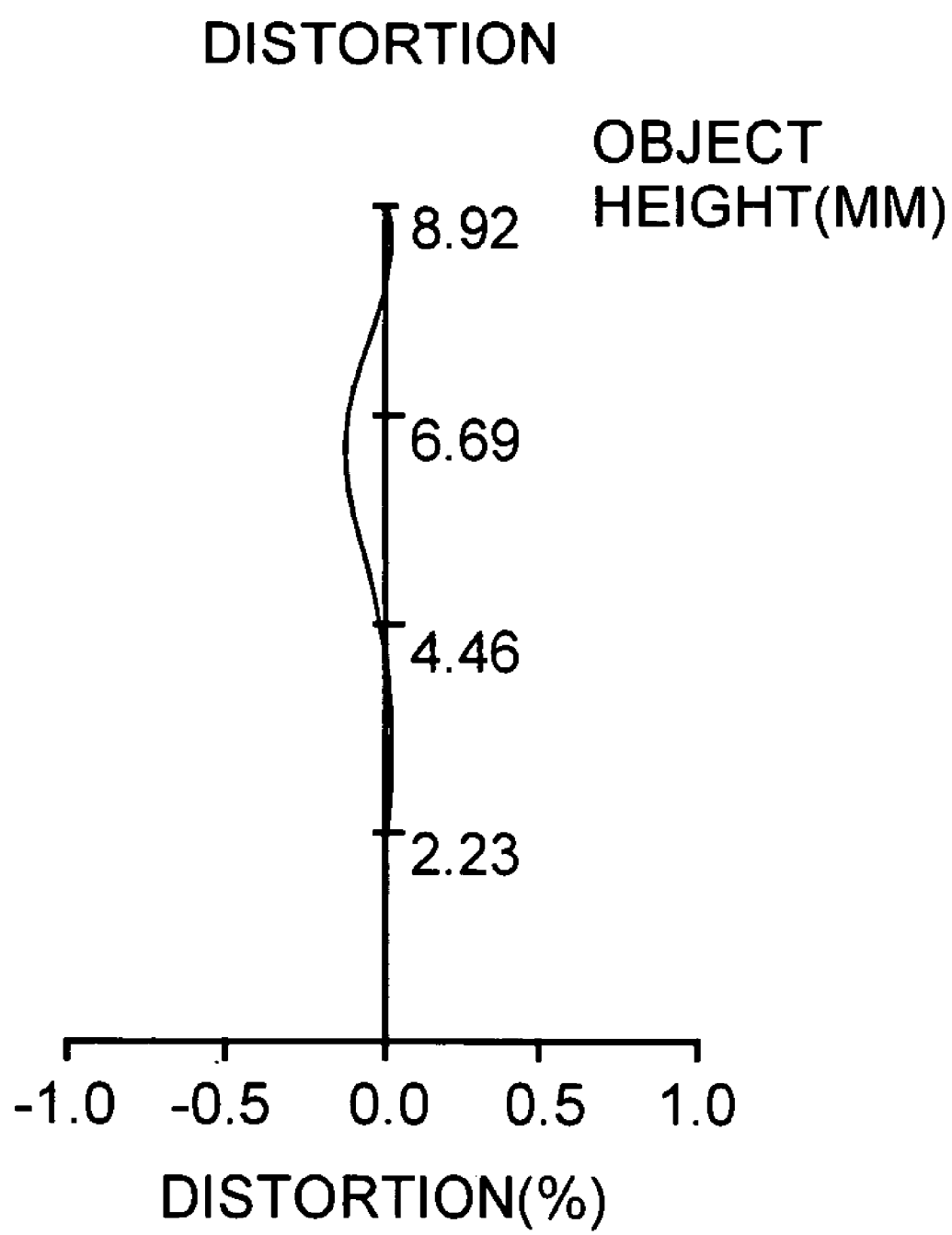
FIG. 15 shows distortion aberration on the imaging plane for the first lens group in the projection optical system according to the first embodiment of the present invention.
Figure 16:
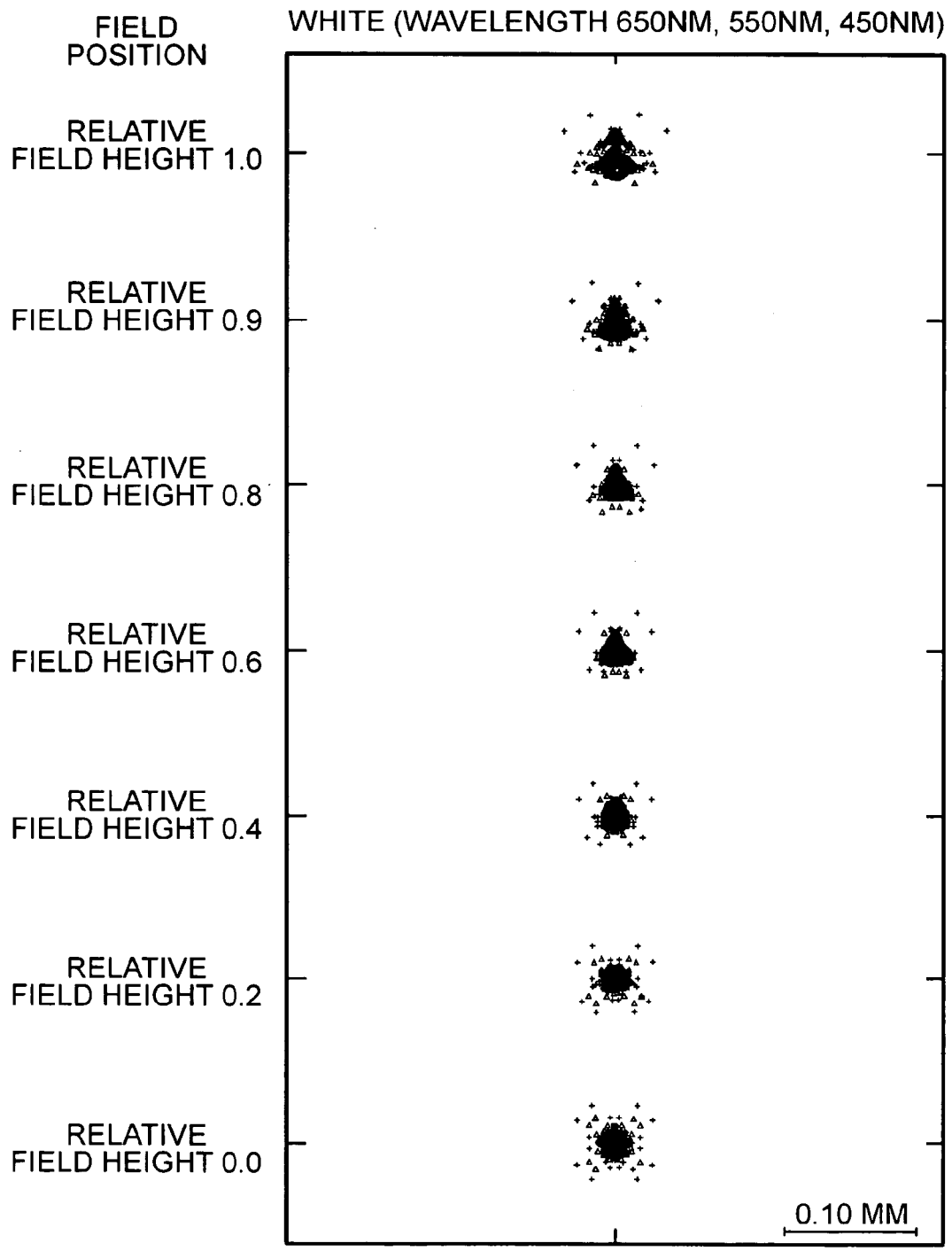
FIG. 16 shows a spot on the imaging plane for the first lens group in the projection optical system according to the first embodiment of the present invention.
Figure 17:
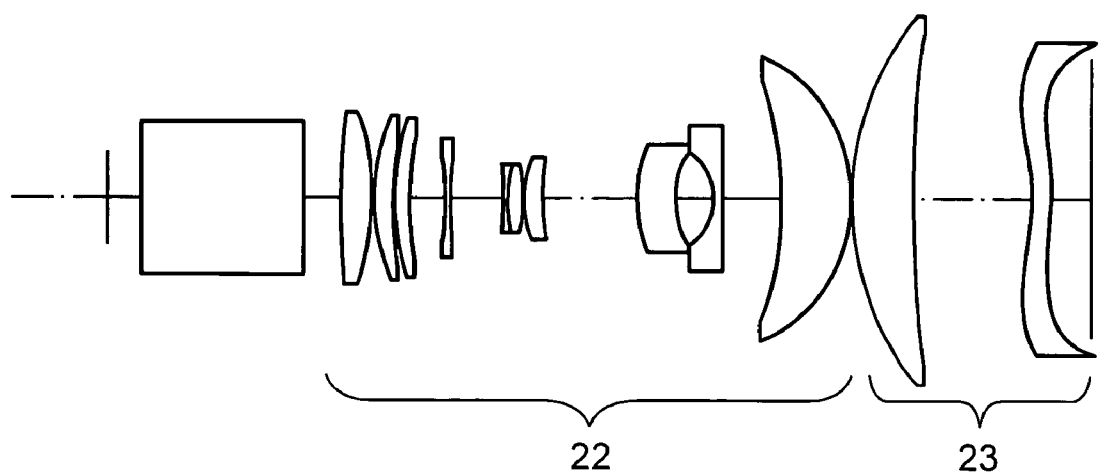
FIG. 17 shows the arrangement of a first lens group in a projection optical system according to a second embodiment of the present invention.
Figure 18:
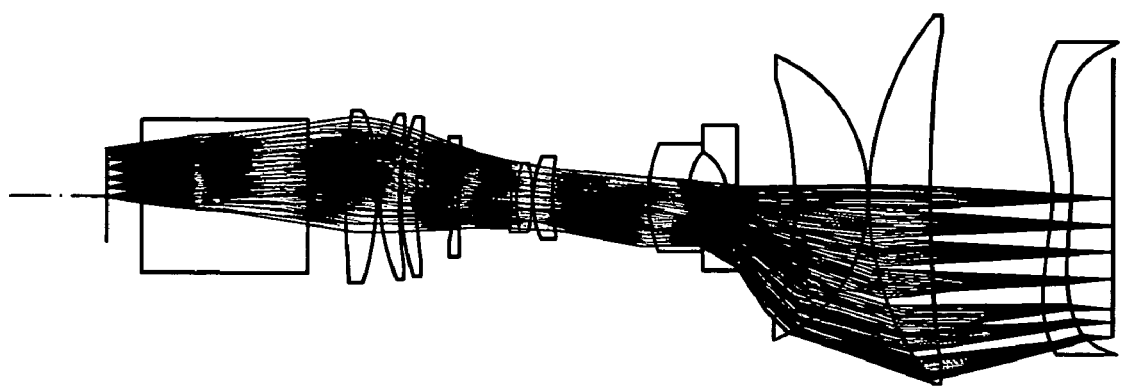
FIG. 18 is a ray tracing diagram for the first lens group in the projection optical system according to the second embodiment of the present invention.
Figure 20:
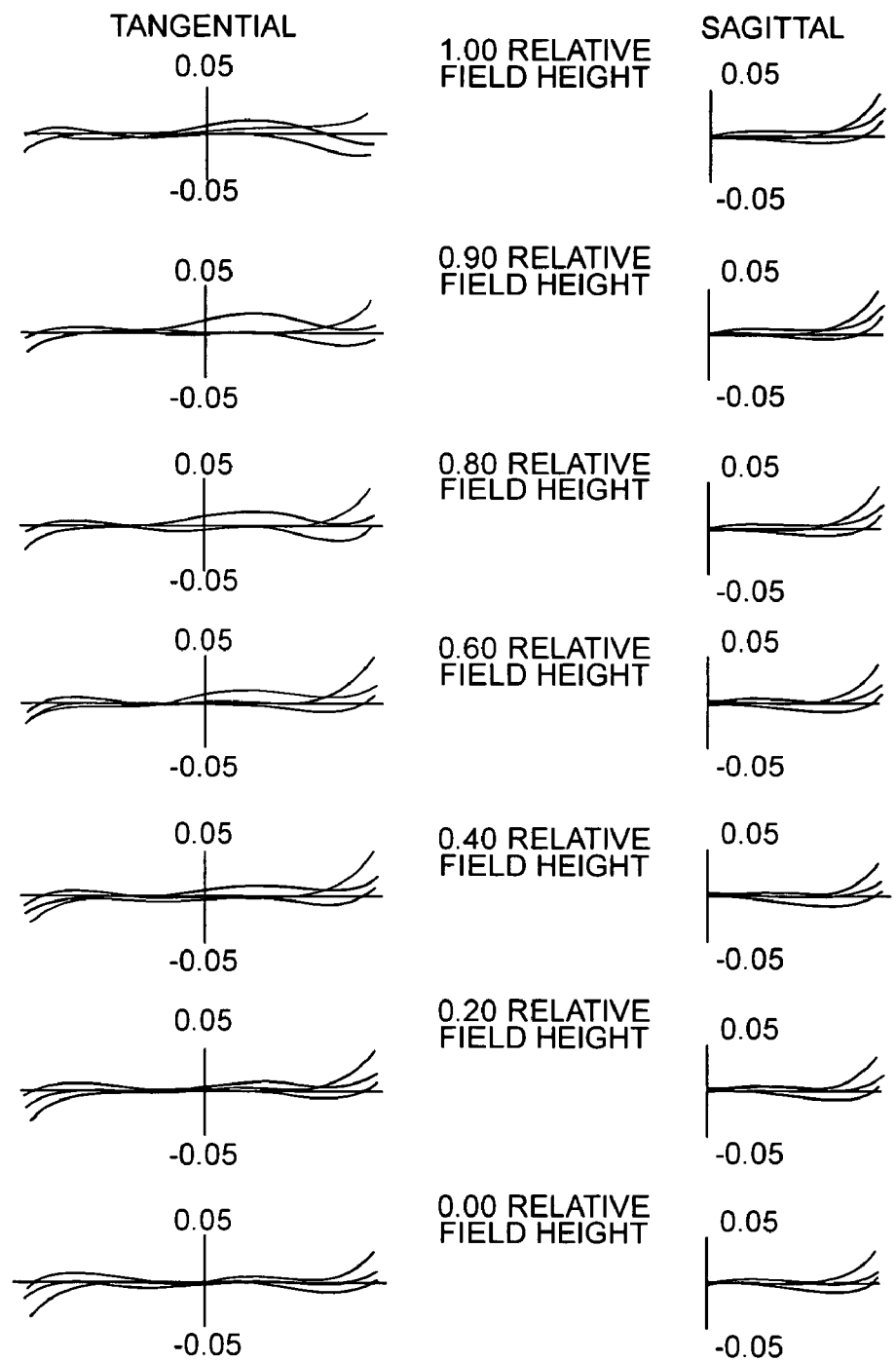
FIG. 20 shows aberration in the imaging plane for the first lens group in the projection optical system according to the second embodiment of the present invention.
Figure 21:
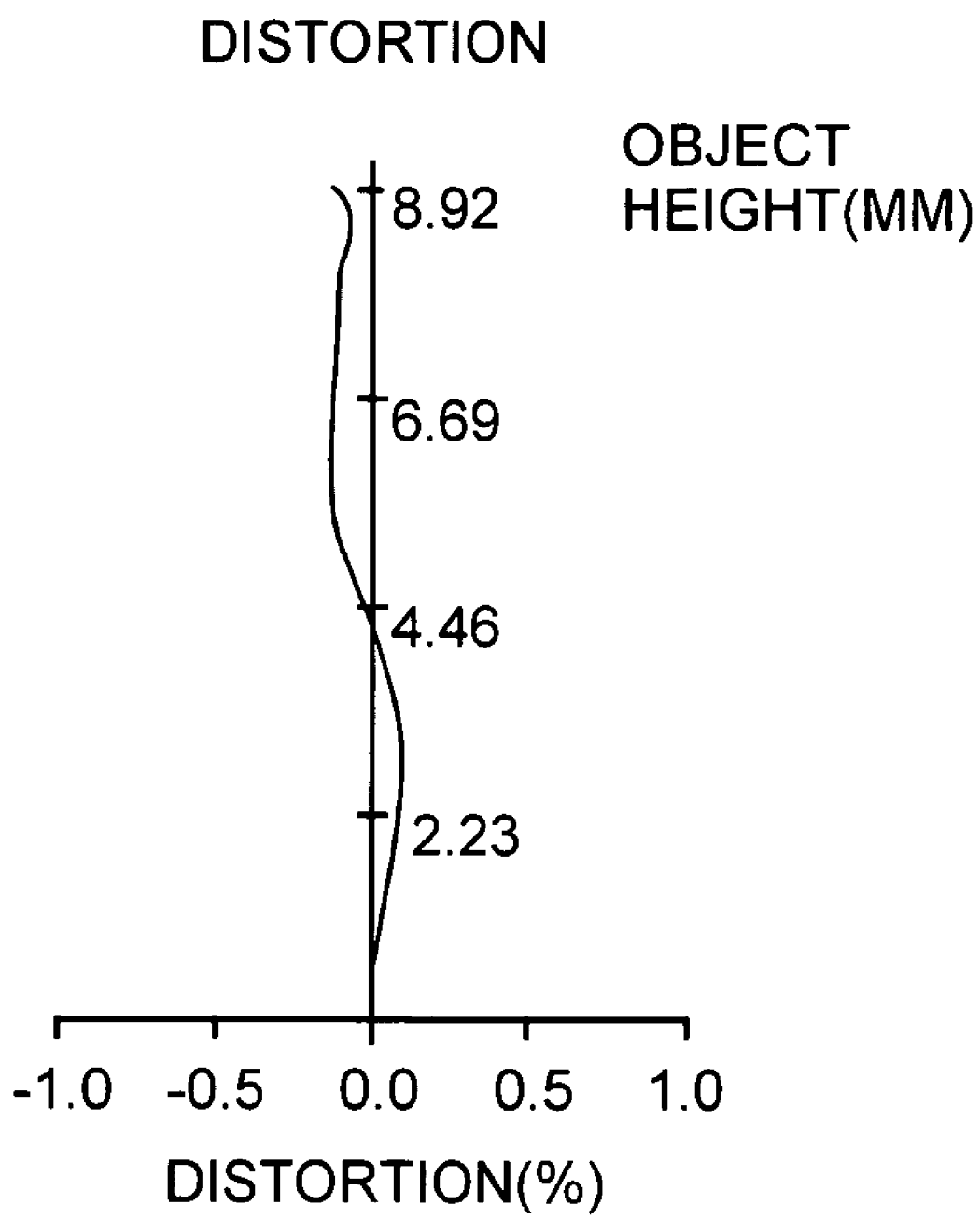
FIG. 21 shows distortion aberration in the imaging plane for the first lens group in the projection optical system according to the second embodiment of the present invention.
Figure 22:
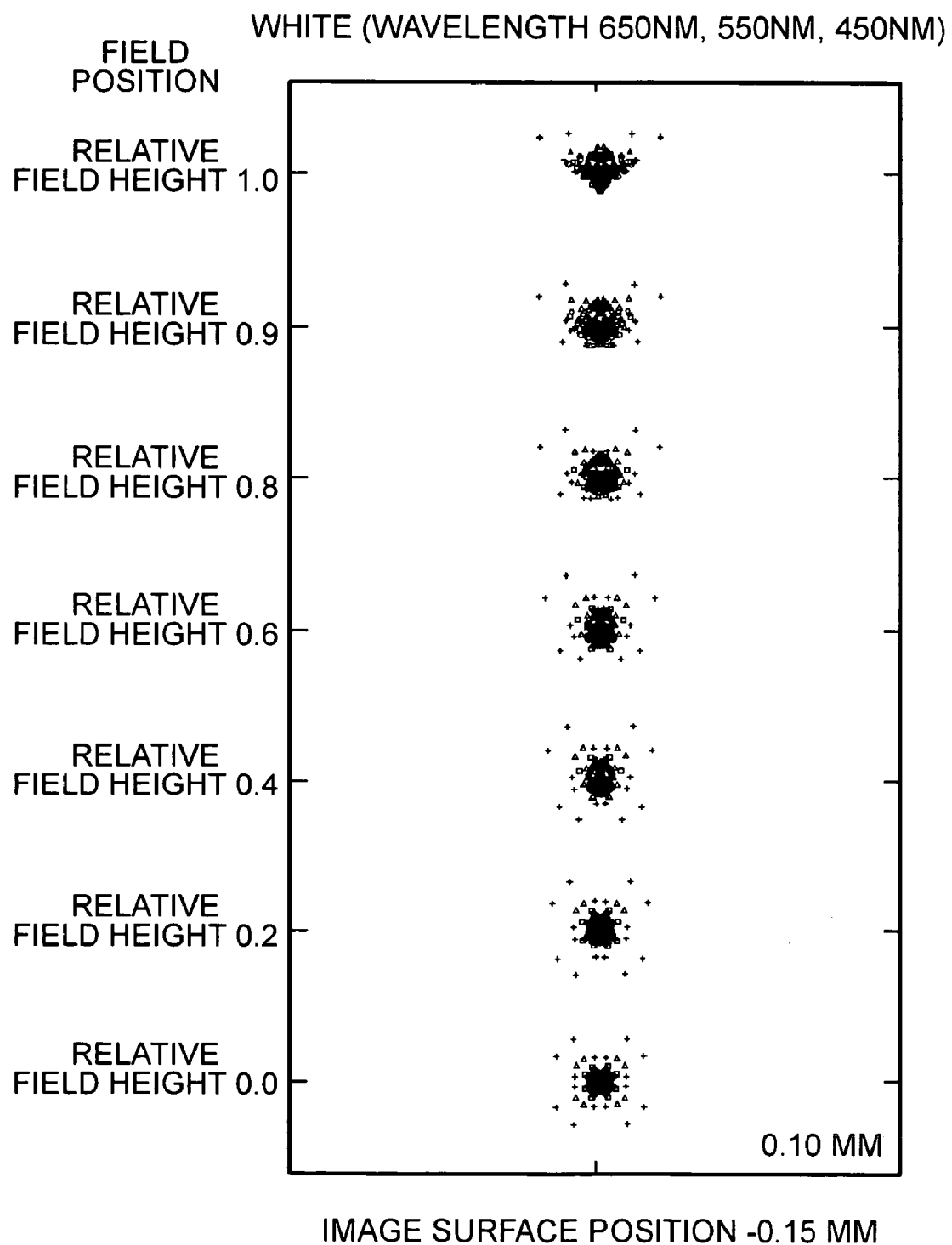
FIG. 22 shows a spot in the imaging plane for the first lens group in the projection optical system according to the second embodiment of the present invention.
Figure 23:
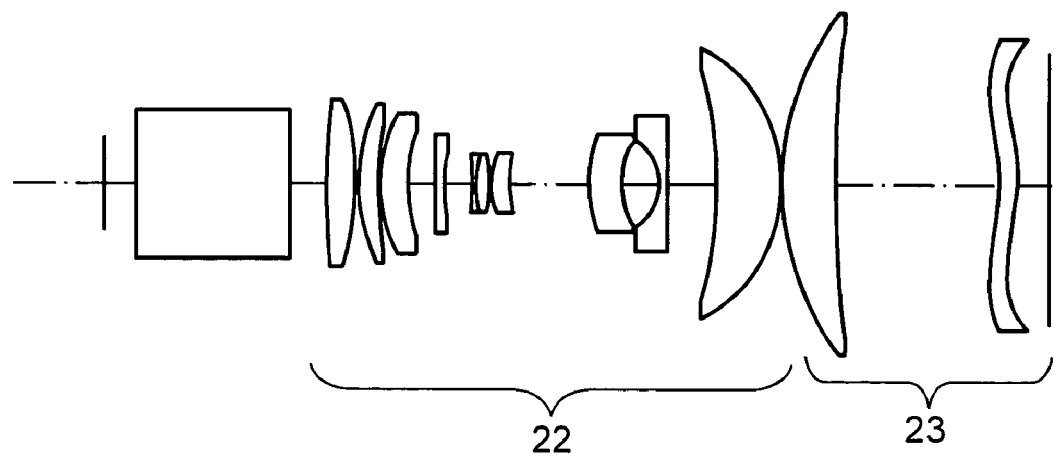
FIG. 23 shows the arrangement of a first lens group in a projection optical system according to a third embodiment of the present invention.
Figure 24:
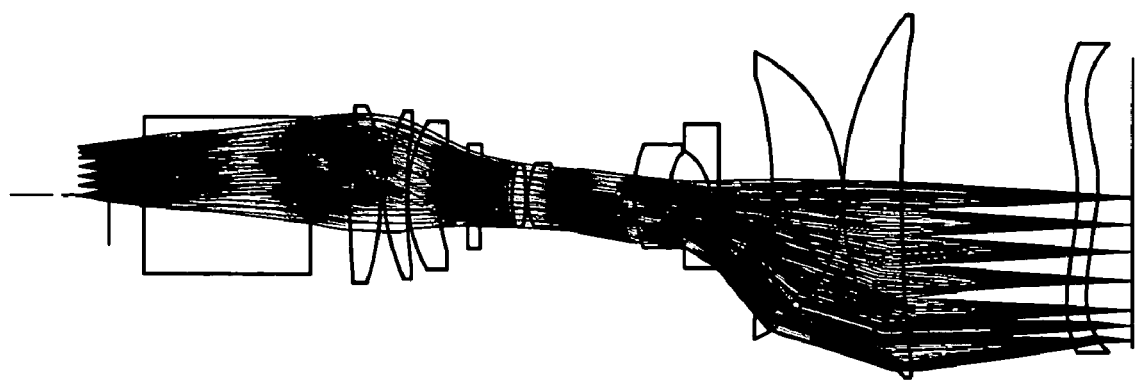
FIG. 24 is a ray tracing diagram for the first lens group in the projection optical system according to the third embodiment of the present invention.
Figure 26:
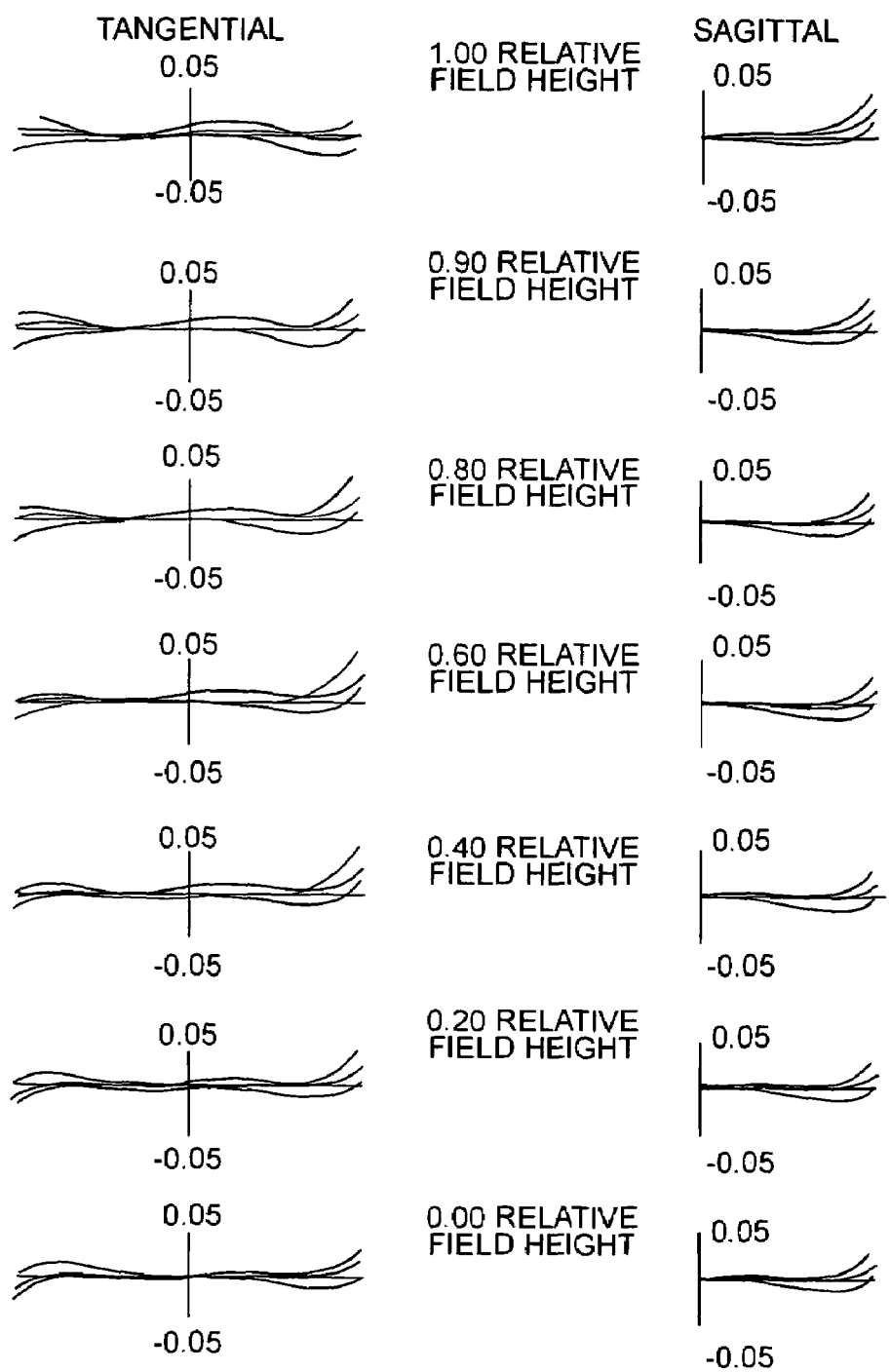
FIG. 26 shows aberration in the imaging plane for the first lens group in the projection optical system according to the third embodiment of the present invention.
Figure 27:
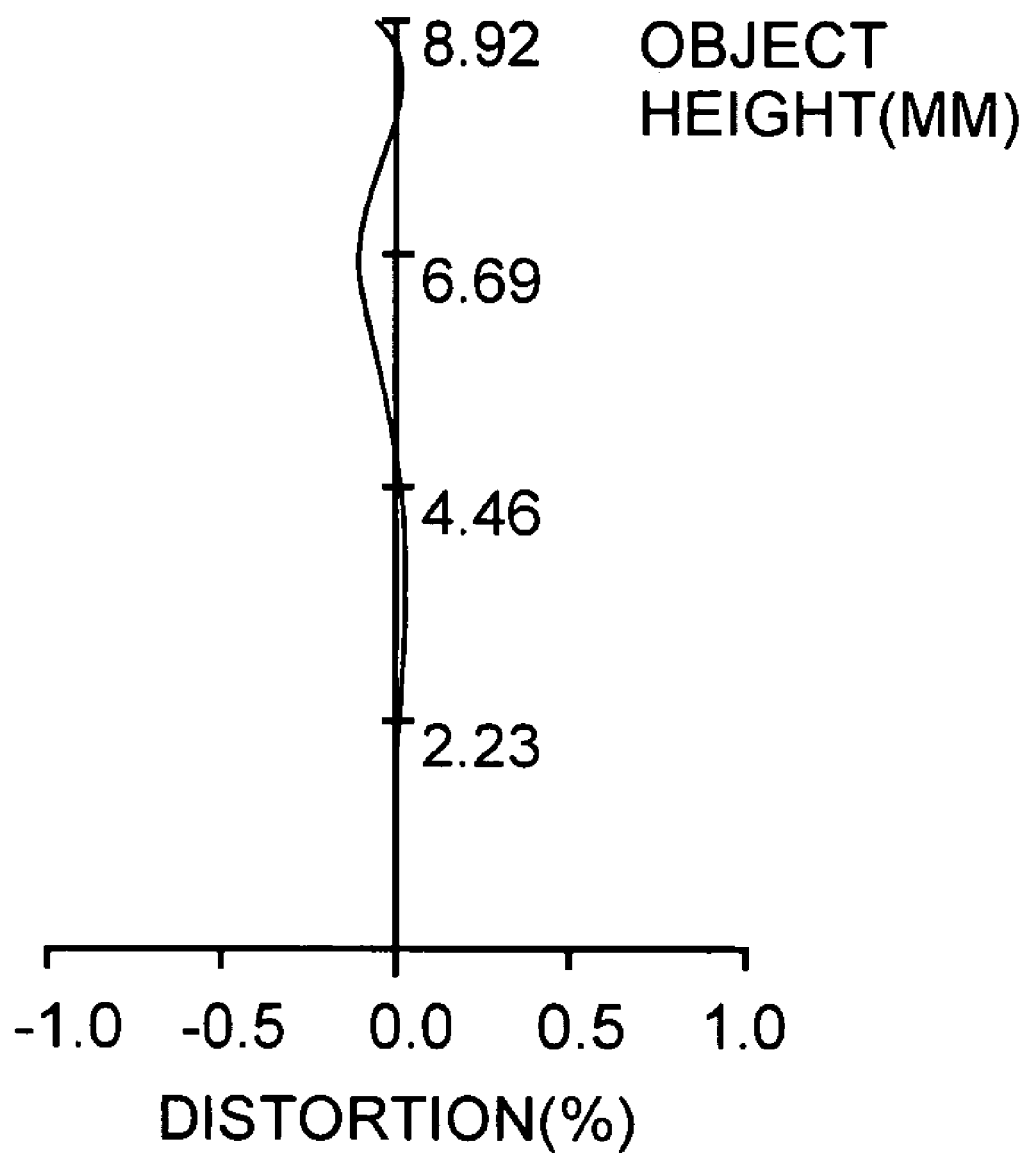
FIG. 27 shows distortion aberration in the imaging plane for the first lens group in the projection optical system according to the third embodiment of the present invention.
Figure 28:
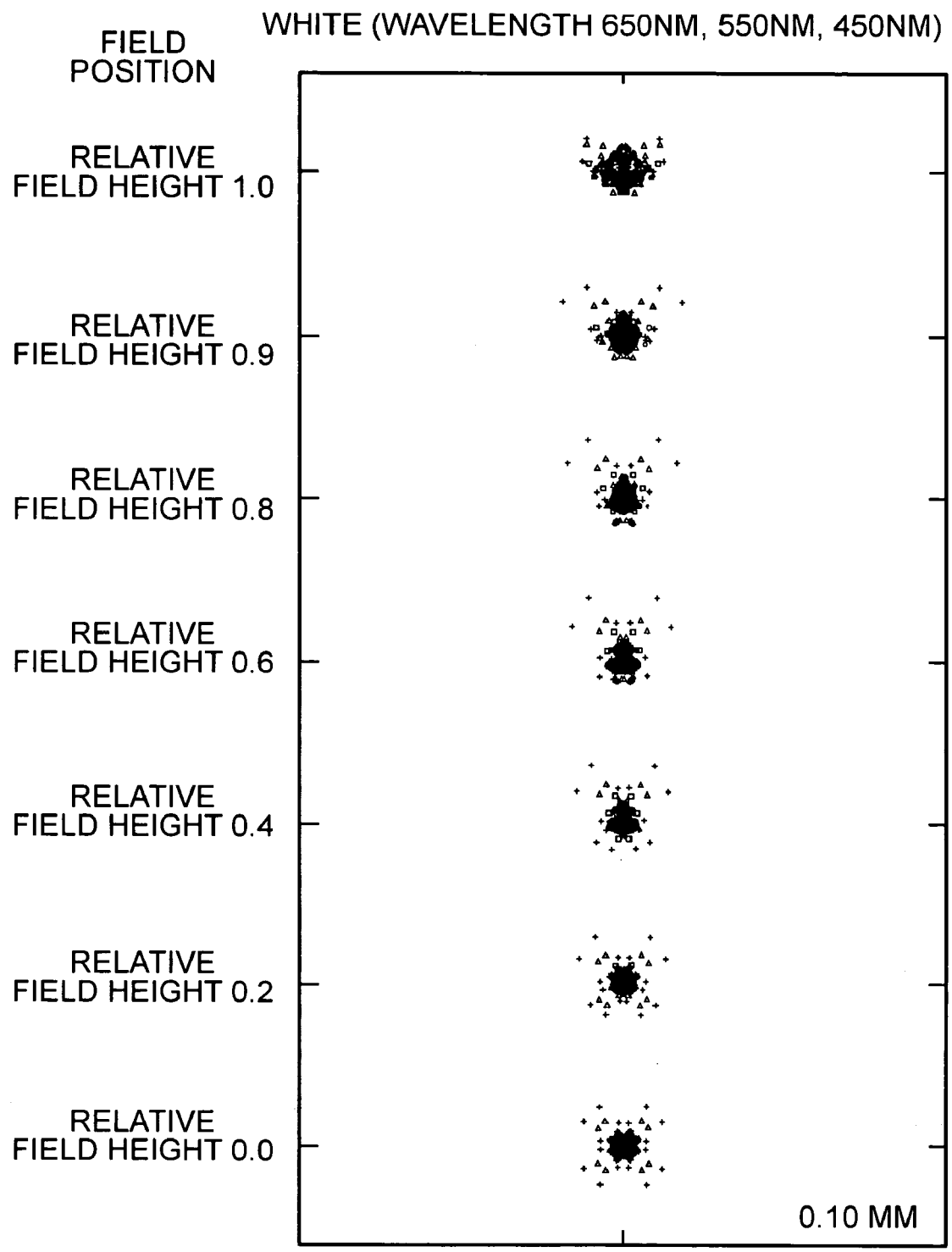
FIG. 28 shows a spot in the imaging plane for the first lens group in the projection optical system according to the third embodiment of the present invention.

In connection with the projection optical unit as the first embodiment of the present invention, FIG. 11 shows the arrangement of the first lens group 22; FIG. 12 is a ray tracing diagram; and FIG. 13 shows lens data. In connection with the first embodiment, FIG. 14 shows aberration; FIG. 15 show distortion aberration; and FIG. 16 is a spot diagram. In FIG. 13, planes 2 and 3 correspond to the cross prism (FIGS. 5 and 6), the first lens group 22 to planes 3 through 21 and the field lenses 23 to planes 22 through 25. The image is focused on the first imaging plane and marked with IMG in FIGS. 5 and 6. Planes 24 and 25 are aspheric and expressed by Equation 1 given below, where the coefficients in the equation are listed in FIG. 13.

$$Z(r) = \frac{r^2/RD}{1+\sqrt{1-(1+K)r^2/RD^2}} + Ar^4 +$$

$$Br^6 + Cr^8 + Dr^{10} + Er^{12} + Fr^{14} + \ldots + Zr^{2n}$$

[Equation 1]

FIGS. 14 to 16 show imaging performance of the first lens group in the projection optical unit in the first embodiment of the present invention. FIGS. 14, 15 and 16 are an aberration diagram, a distortion aberration diagram, and a sport diagram for the imaging plane (IMG) respectively, where the size of the panel as the object plane is 0.7 inch and its aspect ratio is 16:9. Blue light rays with a wavelength of 450 nm, green light rays with a wavelength of 545 nm and red light rays with a wavelength of 625 nm were overlapped and evaluated. These rays are converged to a spot size of 50 µm or so and distortion aberration is 0.1% or less. This result suggests a good imaging performance.

FIGS. 17 to 28 show data for the first lens group 22a in the second and the third embodiment as in the first embodiment. As in the first embodiment, a good imaging performance is apparent from the fact that the spot size is 50 µm and distortion aberration is 0.1% or less.

Figure 29:
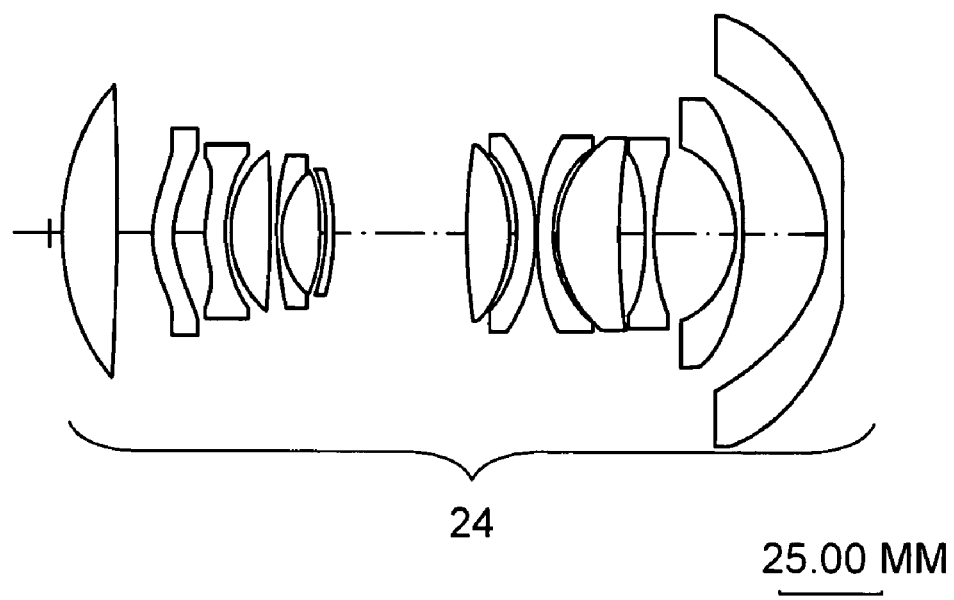
FIG. 29 shows the arrangement of a second lens group in a projection optical system according to the first embodiment of the present invention.
Figure 30:
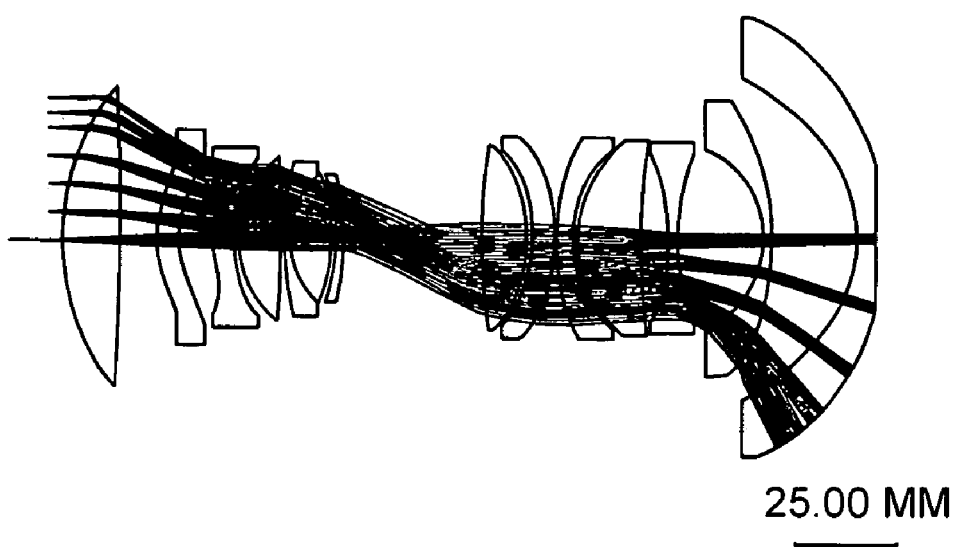
FIG. 30 is a ray tracing diagram for the second lens group in the projection optical system according to the first embodiment of the present invention.
Figure 32:
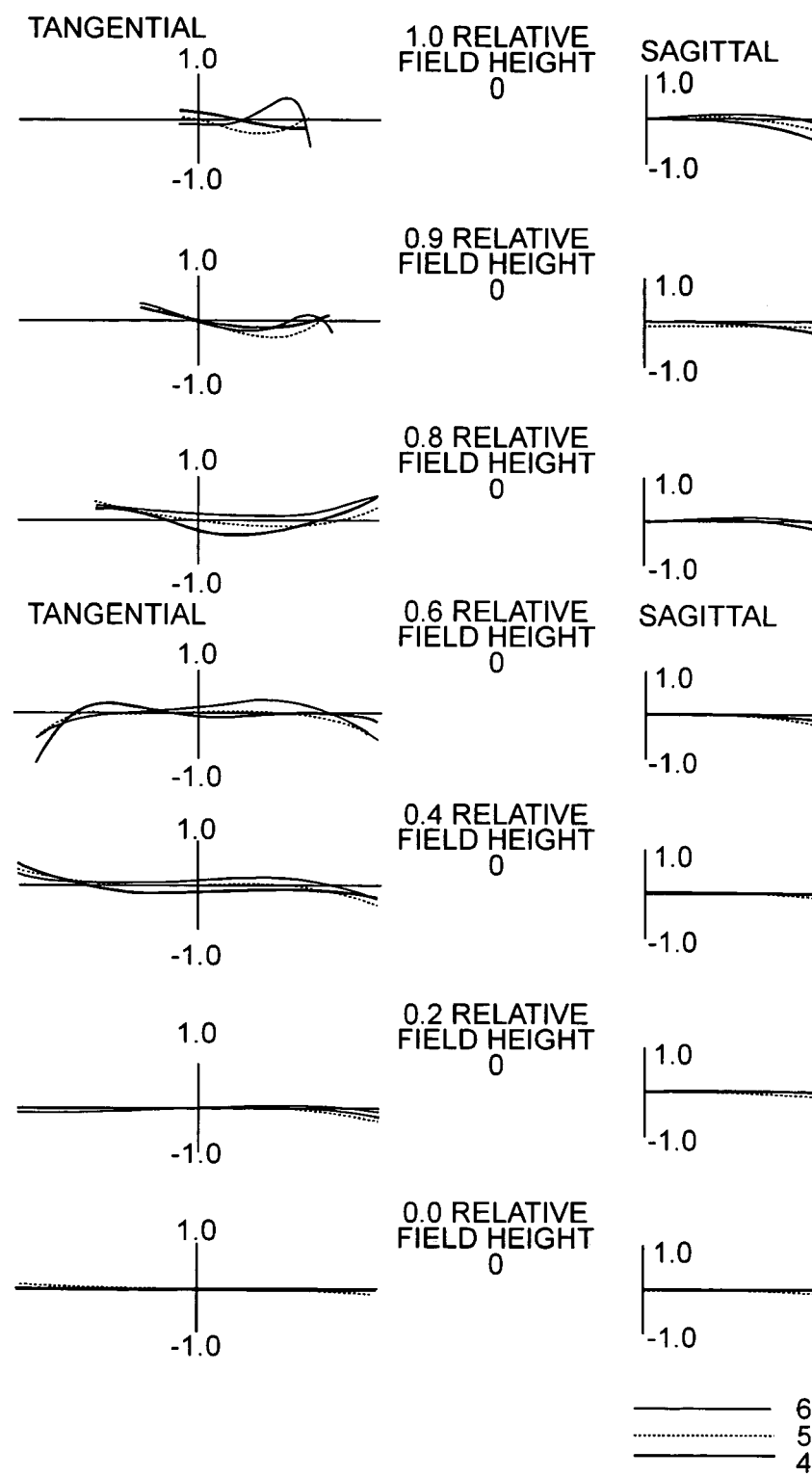
FIG. 32 shows aberration on the imaging plane for the second lens group in the projection optical system according to the first embodiment of the present invention.
Figure 33:
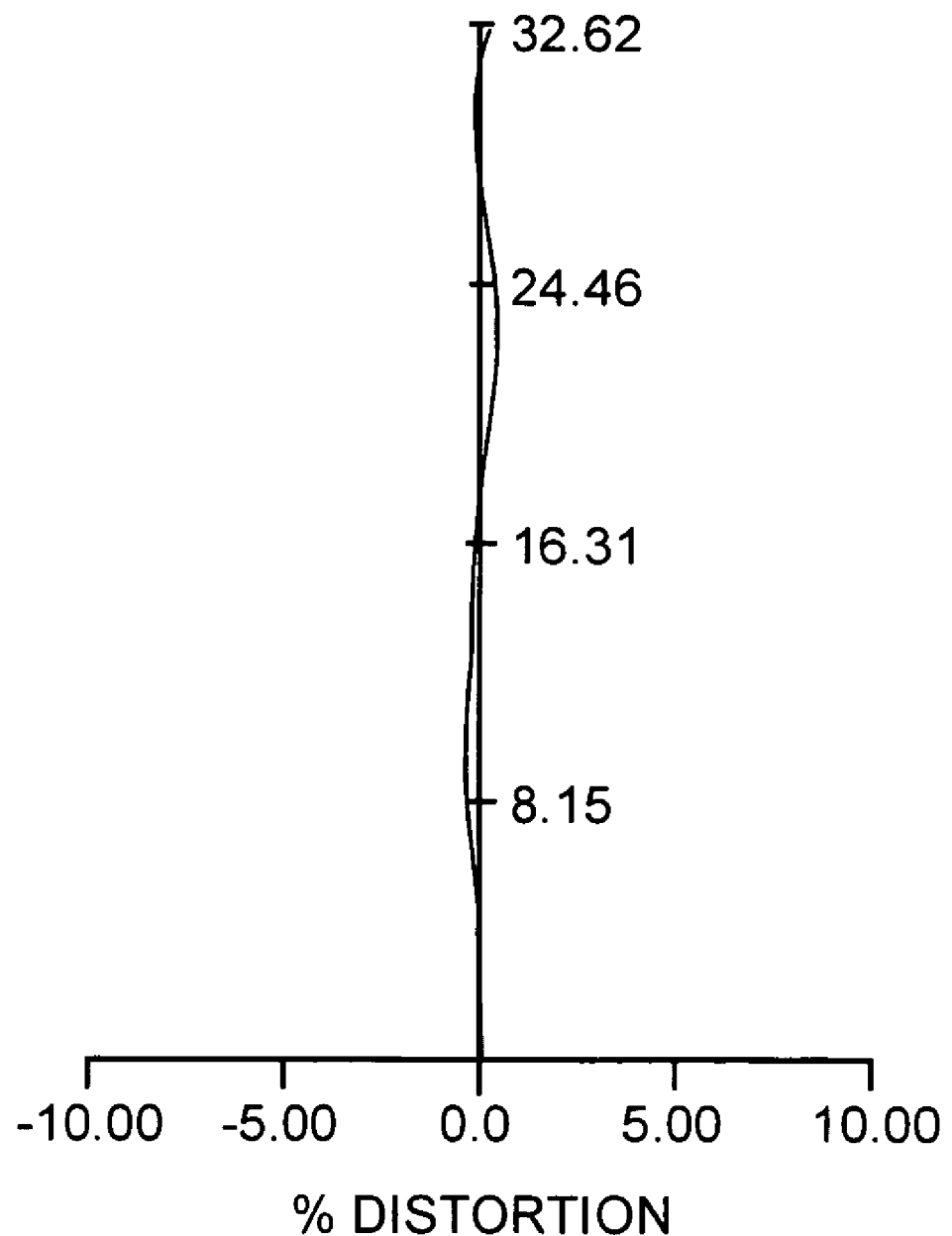
FIG. 33 shows distortion aberration on the imaging plane for the second lens group in the projection optical system according to the first embodiment of the present invention.
Figure 34:
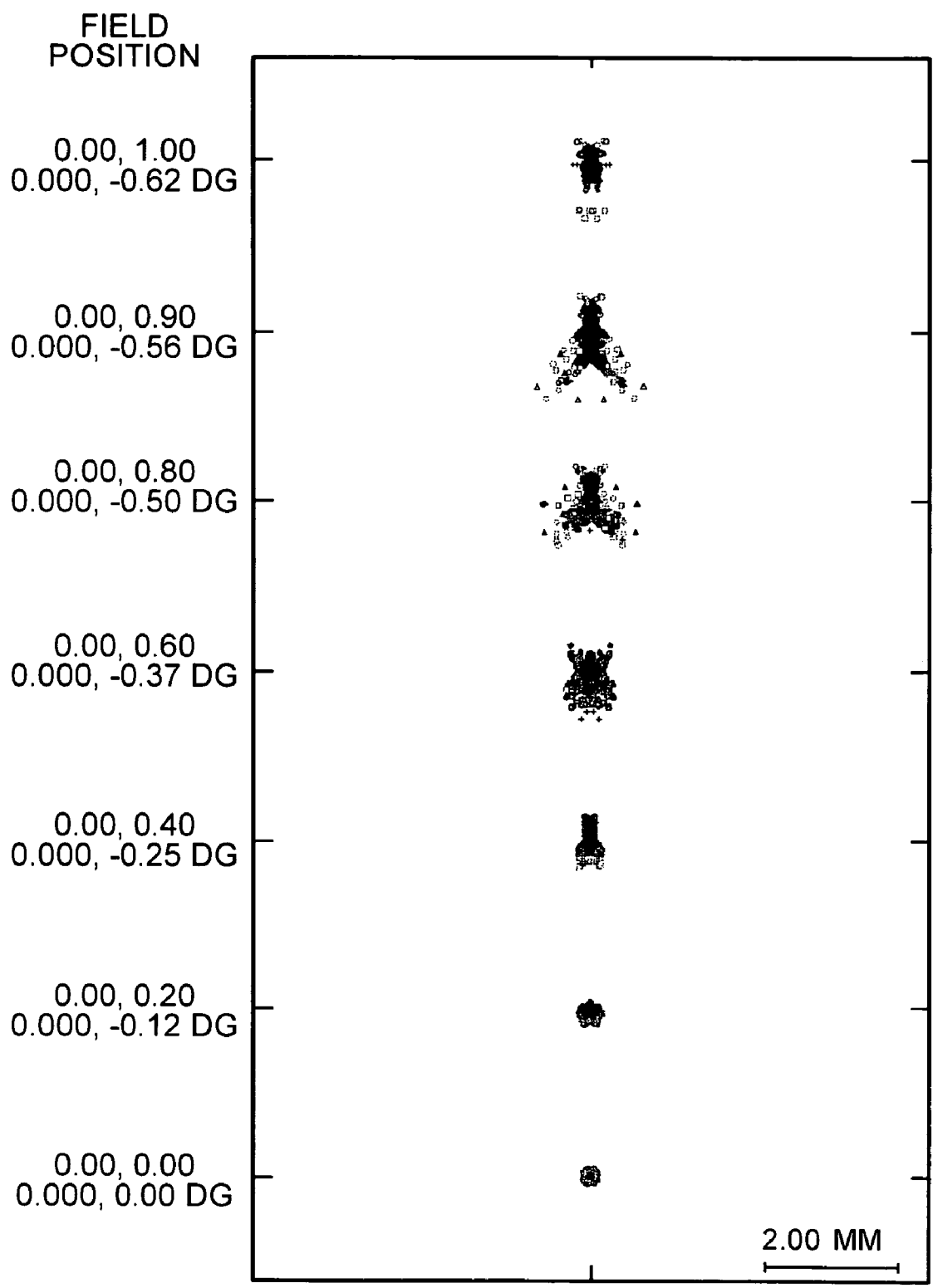
FIG. 34 shows a spot on the imaging plane for the second lens group in the projection optical system according to the first embodiment of the present invention.
Figure 35:
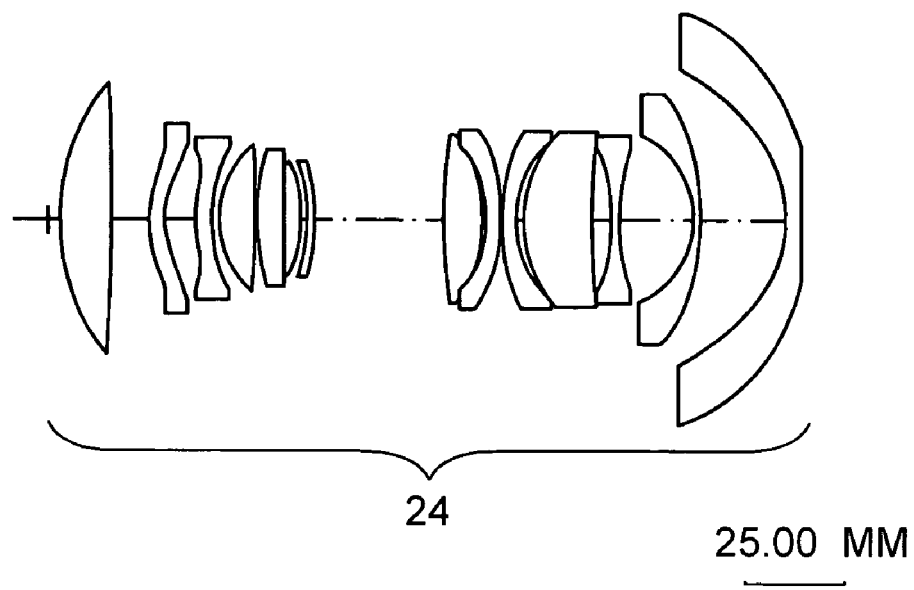
FIG. 35 shows the arrangement of a second lens group in the projection optical system according to the second embodiment of the present invention.
Figure 36:
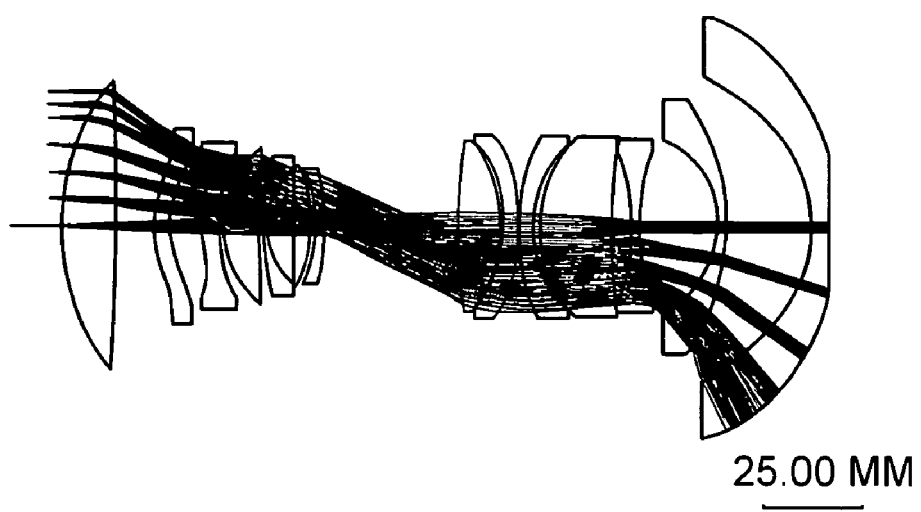
FIG. 36 is a ray tracing diagram for the second lens group in the projection optical system according to the second embodiment of the present invention.
Figure 38:
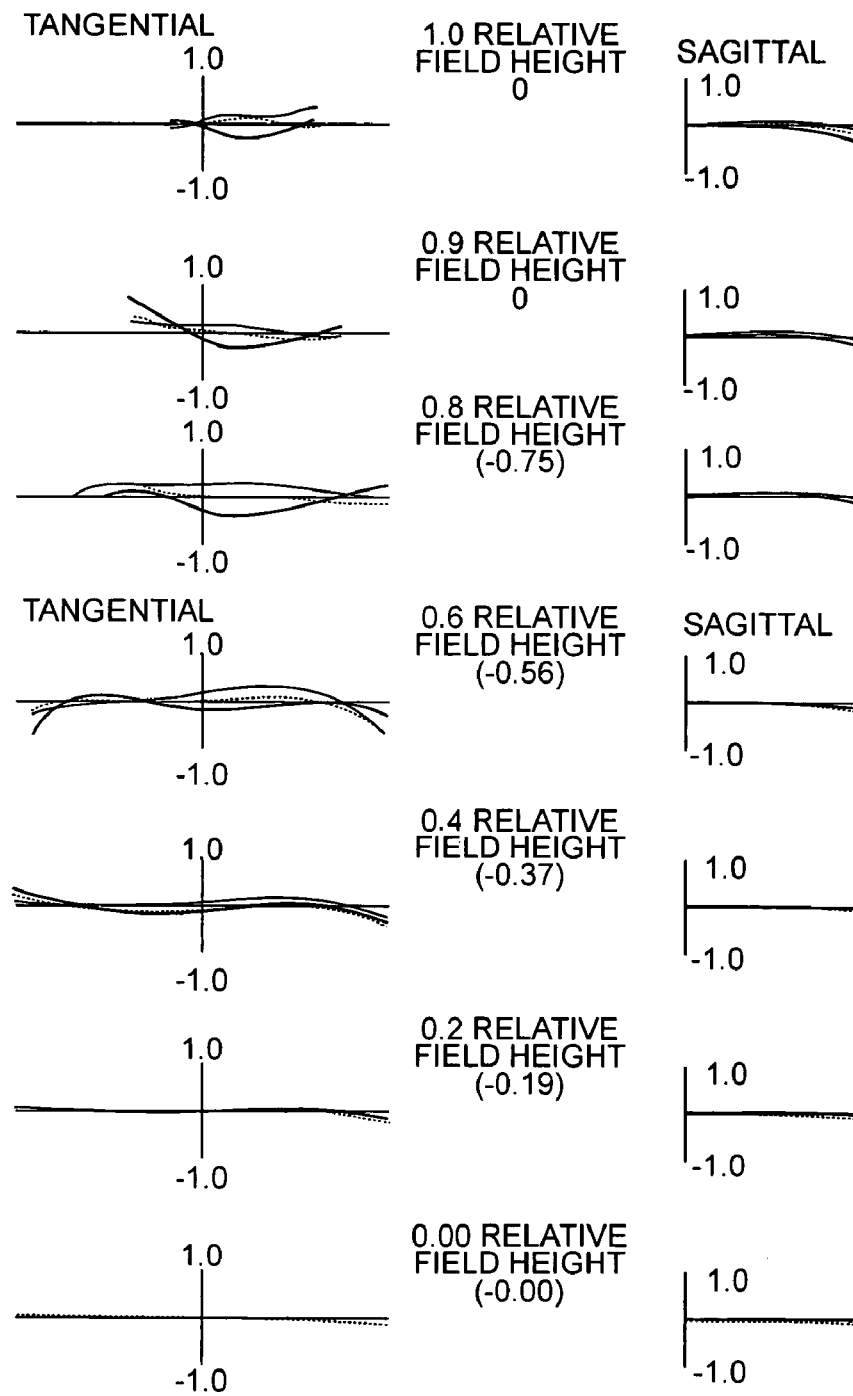
FIG. 38 shows aberration on the imaging plane for the second lens group in the projection optical system according to the second embodiment of the present invention.
Figure 39:
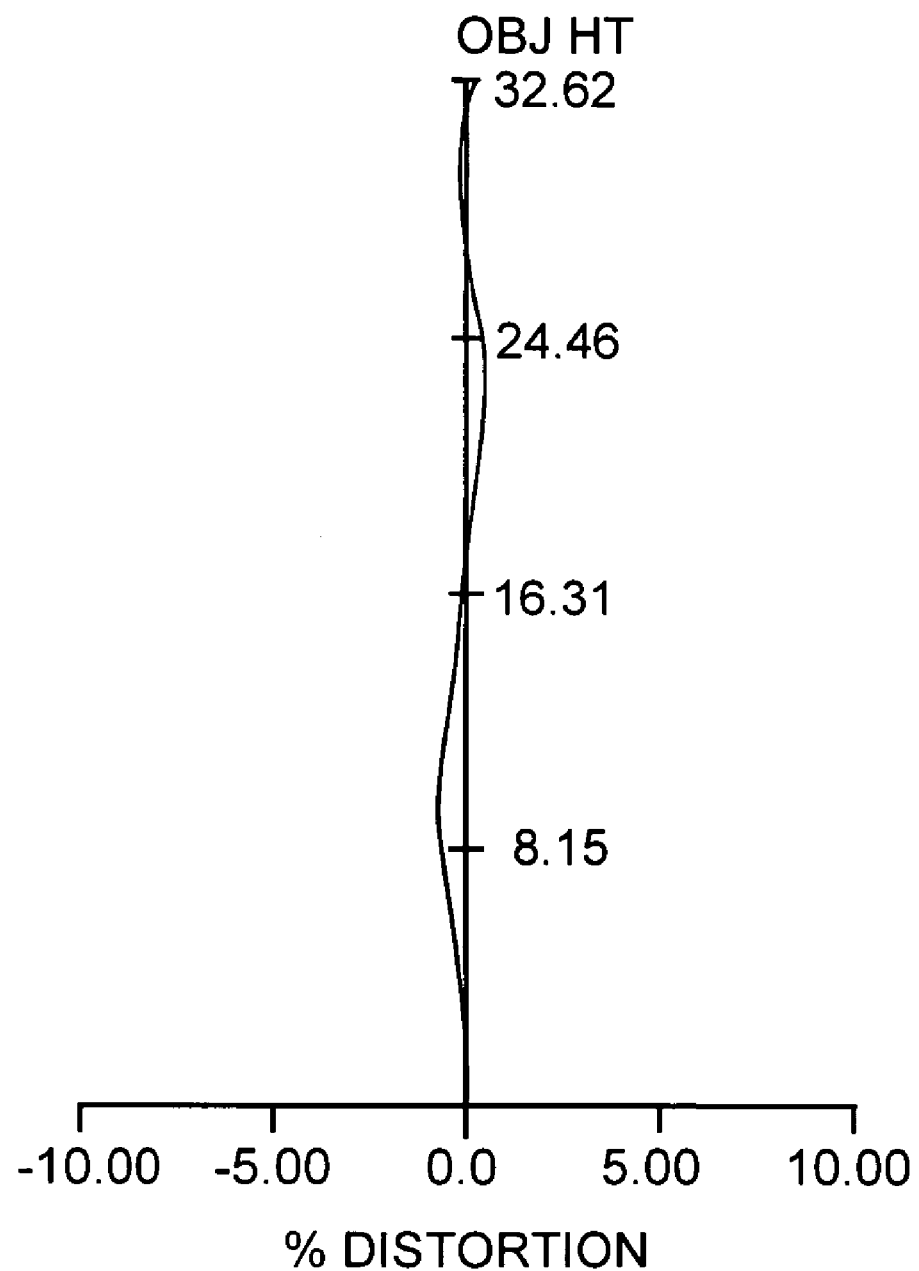
FIG. 39 shows distortion aberration on the imaging plane for the second lens group in the projection optical system according to the second embodiment of the present invention.
Figure 40:
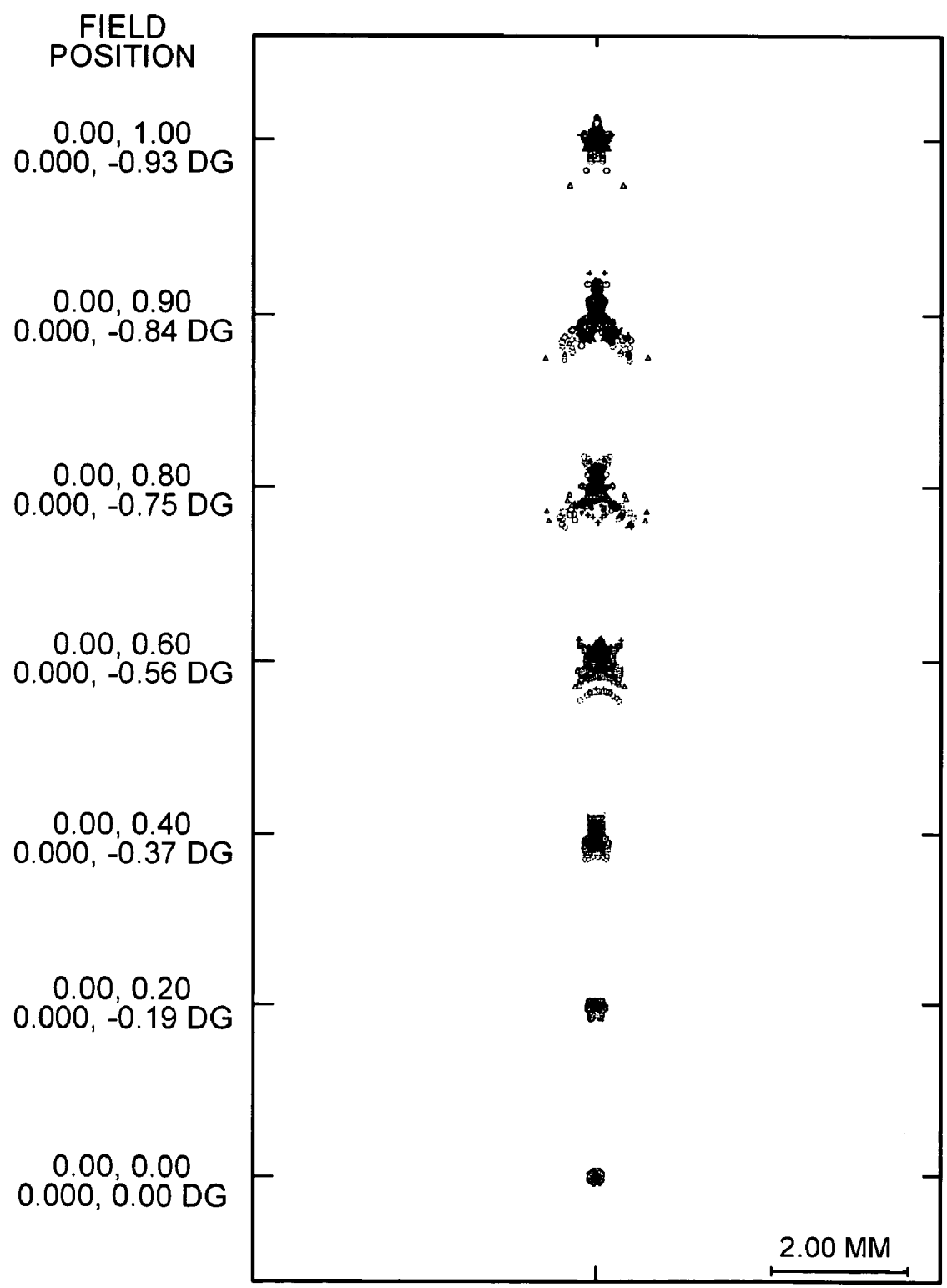
FIG. 40 shows a spot on the imaging plane for the second lens group in the projection optical system according to the second embodiment of the present invention.

Next, regarding the second lens group 24 in the projection optical unit as the first embodiment of the present invention, FIG. 29 shows its lens arrangement, FIG. 30 is a ray tracing diagram and FIG. 31 shows lens data. In connection with the first embodiment, FIG. 32 shows aberration; FIG. 33 shows distortion aberration; and FIG. 34 is a spot diagram. In FIG. 31, planes 1 through 27 correspond to the second lens group and plane 28 corresponds to the imaging plane for the second lens group, or the screen.

In the second lens group 24, plastic aspheric lenses are used for planes 3-4, planes 4-5, planes 16-17, planes 18-19, and planes 26-27. Although conventionally the F number of the first lens group is determined depending on the F number of the illumination optical system, the F number of the first lens group in the present invention is fixed at 3.0. Since the projection magnification is 3, sufficient quantities of light beams can be introduced even when the F number of the second lens group is 9.0. This large F number (9.0) makes it possible to realize a super-wide angle projection optical unit with a view angle of 131 degrees in which the distance from the final plane (plane 27) to the screen (projection distance) is 360 mm for 50-inch projection.

FIGS. 35 to 40 show imaging performance data for the second lens group 24 in the second embodiment of the present invention as in the first embodiment.

FIGS. 32 to 34 and FIGS. 38 to 40 concern screen performance under the condition that the object plane is 2.1 inches, the aspect ratio 16:9 and eccentricity 1:1. Blue light rays with a wavelength of 450 nm, green light rays with a wavelength of 545 nm and red light rays with a wavelength of 625 nm were overlapped and evaluated. The spot size is 1.8 mm or so, distortion aberration is 0.1% or less. This result suggests a good imaging performance.

As indicated in FIGS. 31 and 37, in the rear projection image display apparatus which uses the projection lens unit according to the present invention, the projection distance is very short. Therefore, even when margin required for the housing or a similar factor is taken into consideration, the depth D (in inches) of the apparatus housing is expressed in relation with the transmission screen diagonal size SS as follows:

$D \leq SS/3.0$ (in inches)

This indicates that the set can be compact.

Figure 10:
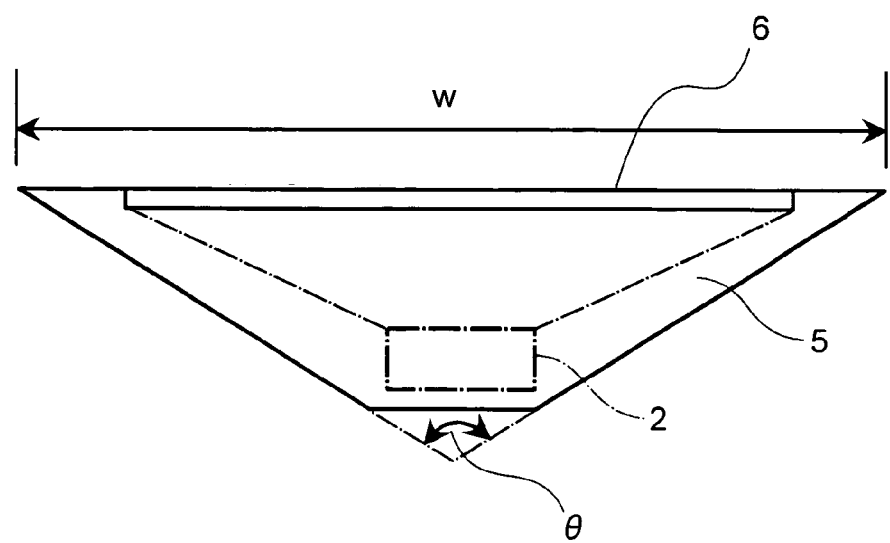
FIG. 10 is a top view showing a rear projection image display apparatus according to an embodiment of the present invention.

FIG. 10 is a top view showing the rear projection image display apparatus as shown in FIG. 3. Because the projection lens unit according to the present invention is a super-wide-angle lens unit, the set can be tapered down from the screen side to the set back side where the tapering angle θ should satisfy the following condition:

$(Ls+SS \times 25.4)/14\theta$

Here, Ls=W−Sw (in mm)
W: housing width (horizontal) in mm
Sw: transmission screen width (horizontal) in mm
θ: housing tapering angle When the above condition is met, as the set is viewed sideways, its back is invisible and its depth looks small.

The application of the projection optical unit according to the present invention is not limited to a rear projection image display apparatus. Obviously it can also be applied to a front projection image display apparatus in which a projection is made from in front of the screen.

As discussed so far, in the projection optical unit according to the present invention, the set provides both super-wide view angle and high focus even at high magnification. Even when the effective display size of the image display device in use is changed, nothing but partial modification to the projection optical unit is necessary. Consequently, an image display apparatus or a rear projection image display apparatus which uses this unit can reduce the cost of developing different sizes of sets and a variety of models which cope with change in the effective display area of image display devices.

What is claimed is:

1. A rear projection image display apparatus comprising:
    an image display device;
    a projection lens system which enlarges and projects an image displayed on the image display device, on a transmission screen;
    a drive circuit which is used to display an image on the image display device; and a housing which houses the image display device, projection lens system and drive circuit;

wherein the projection lens system includes at least a first lens group with positive refractive power and a second lens group with positive refractive power which are located in an optical path from the image display device to the screen, and the first lens group and the second lens group enlarge an image twice or more times and an image enlarged by the second lens group is directly projected on the transmission screen.

2. The rear projection image display apparatus as claimed in claim 1, wherein the following relation between the depth D (in inches) of the housing and the transmission screen diagonal size SS (in inches) exists:

$$40 < SS$$

$$D \leq SS/3.0 \text{ (inches)}.$$

3. The rear projection image display apparatus as claimed in claim 1, wherein the dimensions of the housing satisfy the following condition:

$$(Ls + SS \times 25.4)/14 < \theta$$

where:
Ls=W−Sw(in mm)
W: housing width (horizontal) in mm
Sw: transmission screen width (horizontal) in mm
θ: housing tapering angle (degrees).

4. The rear projection image display apparatus as claimed in claim 1, wherein a first enlarged image made by the first lens group is focused in a position on the image display device side rather than the second lens group side and the magnification M1 of the first enlarged image is smaller than the magnification M2 of a second enlarged image made by the second lens group.

5. The rear projection image display apparatus as claimed in claim 1, wherein a field lens group with positive refractive power is located between the first lens group and the second lens group and the first enlarged image made by the first lens group is focused in the vicinity of the field lens group.

6. The rear projection image display apparatus as claimed in claim 1, wherein a field lens group with positive refractive power is located between the first lens group and the second lens group and the first enlarged image made by the first lens group is focused in a position on the second lens group side rather than the field lens group side.

7. The rear projection image display apparatus as claimed in claim 1, wherein the first lens group is virtually telecentric on the image display device side and an enlarged imaged made by the first lens group is focused in a position on the image display device side rather than the second lens group side and the view angle of the second lens group is 90 degrees or more.

8. The rear projection image display apparatus as claimed in claim 1, wherein the projection lens system and the image display device are located above the lower end of the transmission screen.

* * * * *